United States Patent
Jellick et al.

(10) Patent No.: US 9,384,208 B2
(45) Date of Patent: Jul. 5, 2016

(54) CONFIGURING A CACHED WEBSITE FILE REMOVAL USING A PULLED DATA LIST

(71) Applicant: Go Daddy Operating Company, LLC, Scottsdale, AZ (US)

(72) Inventors: Craig Jellick, Phoenix, AZ (US); David Koopman, Scottsdale, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 505 days.

(21) Appl. No.: 13/772,074

(22) Filed: Feb. 20, 2013

(65) Prior Publication Data
US 2014/0207835 A1    Jul. 24, 2014

Related U.S. Application Data

(63) Continuation-in-part of application No. 13/746,624, filed on Jan. 22, 2013.

(51) Int. Cl.
| | | |
|---|---|---|
| G06F 15/173 | (2006.01) | |
| G06F 17/30 | (2006.01) | |
| H04L 12/24 | (2006.01) | |
| H04L 29/12 | (2006.01) | |
| H04L 12/751 | (2013.01) | |
| H04L 29/08 | (2006.01) | |

(52) U.S. Cl.
CPC ........ *G06F 17/30194* (2013.01); *H04L 41/082* (2013.01); *H04L 61/1511* (2013.01); *H04L 67/2852* (2013.01); *H04L 45/02* (2013.01); *H04L 61/302* (2013.01); *H04L 61/609* (2013.01); *H04L 67/1097* (2013.01)

(58) Field of Classification Search
CPC ............ H04L 67/1097; H04L 67/2852; G06F 17/30483
See application file for complete search history.

(56) References Cited

U.S. PATENT DOCUMENTS

| | | |
|---|---|---|
| 5,426,594 A | 6/1995 | Wright et al. |
| 5,771,354 A | 6/1998 | Crawford |
| 5,774,660 A | 6/1998 | Brendel et al. |
| 5,870,550 A | 2/1999 | Wesinger et al. |
| 5,872,848 A | 2/1999 | Romney et al. |
| 5,901,228 A | 5/1999 | Crawford |
| 6,003,030 A | 12/1999 | Kenner et al. |
| 6,012,066 A | 1/2000 | Discount et al. |

(Continued)

FOREIGN PATENT DOCUMENTS

WO    2007052285    5/2007

OTHER PUBLICATIONS

QuackIT; "Cold Fusion Administration"; Oct. 14, 2007; QuackIT.com; pp. 1-3.
Cisco; "Configuring Virtual Interfaces"; May 2, 2005; excerpt from Cisco IOS Interface and Hardware Component Configuration Guide; pp. 1-12.
Cisco01; "Chapter 7: Configuring Switches"; Apr. 14, 2008; www.Cisco.com; pp. 1-9.

(Continued)

*Primary Examiner* — Brian J Gillis
*Assistant Examiner* — Shean Tokuta
(74) *Attorney, Agent, or Firm* — Quarles & Brady LLP

(57) ABSTRACT

An exemplary method generating a data list of at least one website and configuring a server computer to clear a cache for the at least one website may comprise the steps of the server computer requesting a data list generated from one or more job records, identifying one or more websites within the data list to remove one or more website files within a cache on another server, removing the website file(s) from the cache and transmitting instructions to write a job check in record to a database on the other server.

20 Claims, 19 Drawing Sheets

(56) References Cited

U.S. PATENT DOCUMENTS

| | | | |
|---|---|---|---|
| 6,108,703 A | 8/2000 | Leighton et al. | |
| 6,151,631 A | 11/2000 | Ansell et al. | |
| 6,263,447 B1 | 7/2001 | French et al. | |
| 6,308,275 B1 | 10/2001 | Vaswani et al. | |
| 6,393,482 B1 | 5/2002 | Rai et al. | |
| 6,400,722 B1 | 6/2002 | Chuah et al. | |
| 6,411,943 B1 | 6/2002 | Crawford | |
| 6,553,413 B1 | 4/2003 | Leighton et al. | |
| 6,598,077 B2 | 7/2003 | Primak et al. | |
| 6,625,643 B1 | 9/2003 | Colby et al. | |
| 6,629,136 B1 | 9/2003 | Naidoo | |
| 6,647,422 B2 | 11/2003 | Wesinger et al. | |
| 6,654,804 B1 | 11/2003 | Fleming, III | |
| 6,675,208 B1 | 1/2004 | Rai et al. | |
| 6,757,740 B1 | 6/2004 | Parekh et al. | |
| 6,789,103 B1 | 9/2004 | Kim et al. | |
| 6,829,230 B1 | 12/2004 | Tiuri | |
| 6,842,769 B1 | 1/2005 | Kim et al. | |
| 6,868,444 B1 | 3/2005 | Kim et al. | |
| 6,888,836 B1 | 5/2005 | Cherkasova | |
| 6,996,609 B2 | 2/2006 | Hickman et al. | |
| 7,080,051 B1 | 7/2006 | Crawford | |
| 7,111,072 B1 | 9/2006 | Matthews et al. | |
| 7,117,504 B2 | 10/2006 | Smith et al. | |
| 7,139,840 B1 | 11/2006 | O'Toole | |
| 7,149,892 B2 | 12/2006 | Freed et al. | |
| 7,197,545 B1 | 3/2007 | Davie | |
| 7,225,248 B1 | 5/2007 | Osburn, III | |
| 7,233,978 B2 | 6/2007 | Overton et al. | |
| 7,359,935 B1 | 4/2008 | Karipides et al. | |
| 7,369,996 B2 | 5/2008 | Sladden | |
| 7,373,500 B2 | 5/2008 | Ramelson et al. | |
| 7,383,327 B1 | 6/2008 | Tormasov et al. | |
| 7,386,880 B2 | 6/2008 | Wesinger et al. | |
| 7,392,321 B1 | 6/2008 | Wolf et al. | |
| 7,414,981 B2 | 8/2008 | Jaramillo et al. | |
| 7,433,710 B2 | 10/2008 | Bodnar et al. | |
| 7,454,457 B1 | 11/2008 | Lowery et al. | |
| 7,487,546 B1 | 2/2009 | Szor | |
| 7,506,010 B2 | 3/2009 | Kulkarni et al. | |
| 7,590,073 B2 | 9/2009 | Beckmann et al. | |
| 7,599,847 B2 | 10/2009 | Block et al. | |
| 7,644,117 B2 | 1/2010 | Zimmerman et al. | |
| 7,647,387 B2 | 1/2010 | Bellare et al. | |
| 7,649,854 B2 | 1/2010 | Piper | |
| 7,716,367 B1 | 5/2010 | Leighton et al. | |
| 7,783,540 B2 | 8/2010 | Davis et al. | |
| 7,804,982 B2 | 9/2010 | Howard et al. | |
| 7,805,379 B1 | 9/2010 | Adkins, III et al. | |
| 7,941,510 B1 | 5/2011 | Tormasov et al. | |
| 7,987,262 B2 | 7/2011 | Tung et al. | |
| 8,024,578 B2 | 9/2011 | Geosimonian | |
| 2001/0001854 A1 | 5/2001 | Schena | |
| 2001/0011304 A1 | 8/2001 | Wesinger et al. | |
| 2001/0046227 A1 | 11/2001 | Matsuhira et al. | |
| 2002/0035611 A1 | 3/2002 | Dooley | |
| 2002/0042719 A1 | 4/2002 | Chauchard et al. | |
| 2002/0073235 A1 | 6/2002 | Chen et al. | |
| 2002/0087643 A1 | 7/2002 | Parsons et al. | |
| 2002/0143564 A1 | 10/2002 | Webb et al. | |
| 2002/0143664 A1 | 10/2002 | Webb | |
| 2002/0147790 A1 | 10/2002 | Snow | |
| 2002/0152224 A1 | 10/2002 | Roth et al. | |
| 2002/0163925 A1* | 11/2002 | Nakagawa et al. | 370/428 |
| 2003/0005287 A1 | 1/2003 | Wray et al. | |
| 2003/0009594 A1 | 1/2003 | McElligott | |
| 2003/0069953 A1 | 4/2003 | Bottom et al. | |
| 2003/0069991 A1 | 4/2003 | Brescia | |
| 2003/0078894 A1 | 4/2003 | Kon | |
| 2003/0078962 A1 | 4/2003 | Fabbricatore et al. | |
| 2003/0101278 A1 | 5/2003 | Garcia-Luna-Aceves et al. | |
| 2003/0120502 A1 | 6/2003 | Robb et al. | |
| 2003/0229900 A1 | 12/2003 | Reisman | |
| 2004/0039906 A1 | 2/2004 | Oka et al. | |
| 2004/0083306 A1 | 4/2004 | Gloe | |
| 2004/0083307 A1 | 4/2004 | Uysal | |
| 2004/0088422 A1 | 5/2004 | Flynn et al. | |
| 2004/0133440 A1 | 7/2004 | Carolan et al. | |
| 2004/0148229 A1 | 7/2004 | Maxwell | |
| 2004/0167858 A1 | 8/2004 | Erickson | |
| 2004/0186778 A1 | 9/2004 | Margiloff et al. | |
| 2004/0210663 A1 | 10/2004 | Phillips et al. | |
| 2004/0225728 A1* | 11/2004 | Huggins et al. | 709/223 |
| 2005/0038658 A1 | 2/2005 | Sladden | |
| 2005/0105513 A1 | 5/2005 | Sullivan et al. | |
| 2005/0114541 A1 | 5/2005 | Ghetie et al. | |
| 2005/0134896 A1 | 6/2005 | Koga | |
| 2005/0172080 A1* | 8/2005 | Miyauchi | 711/136 |
| 2005/0228881 A1 | 10/2005 | Reasor et al. | |
| 2005/0239447 A1 | 10/2005 | Holzman et al. | |
| 2006/0047725 A1 | 3/2006 | Bramson | |
| 2006/0100912 A1 | 5/2006 | Kumar et al. | |
| 2006/0126201 A1 | 6/2006 | Jain | |
| 2006/0129635 A1 | 6/2006 | Baccou et al. | |
| 2006/0139312 A1 | 6/2006 | Sinclair, II et al. | |
| 2006/0193333 A1 | 8/2006 | Baughan et al. | |
| 2006/0198322 A1 | 9/2006 | Hares | |
| 2006/0200527 A1 | 9/2006 | Woods | |
| 2006/0206547 A1 | 9/2006 | Kulkarni et al. | |
| 2006/0236254 A1 | 10/2006 | Mateescu et al. | |
| 2006/0245433 A1 | 11/2006 | Berg et al. | |
| 2007/0021971 A1 | 1/2007 | McKinney et al. | |
| 2007/0038755 A1 | 2/2007 | Sullivan et al. | |
| 2007/0061462 A1 | 3/2007 | Kim et al. | |
| 2007/0061465 A1 | 3/2007 | Kim et al. | |
| 2007/0094411 A1 | 4/2007 | Mullane et al. | |
| 2007/0150363 A1 | 6/2007 | Patrawala | |
| 2007/0153691 A1 | 7/2007 | Halpern | |
| 2007/0174237 A1 | 7/2007 | Wilbrink et al. | |
| 2007/0174635 A1 | 7/2007 | Jones | |
| 2007/0180436 A1 | 8/2007 | Travostino et al. | |
| 2007/0192493 A1 | 8/2007 | Manolache et al. | |
| 2007/0198724 A1 | 8/2007 | Hawkinson et al. | |
| 2007/0198946 A1 | 8/2007 | Viji et al. | |
| 2007/0219875 A1 | 9/2007 | Toulotte | |
| 2007/0225962 A1 | 9/2007 | Brunet et al. | |
| 2007/0283005 A1 | 12/2007 | Beliles et al. | |
| 2007/0291739 A1 | 12/2007 | Sullivan et al. | |
| 2008/0005312 A1 | 1/2008 | Boss et al. | |
| 2008/0010139 A1 | 1/2008 | Elmer et al. | |
| 2008/0019359 A1 | 1/2008 | Droux et al. | |
| 2008/0046340 A1 | 2/2008 | Brown | |
| 2008/0052384 A1 | 2/2008 | Marl | |
| 2008/0059532 A1* | 3/2008 | Kazmi et al. | 707/104.1 |
| 2008/0059607 A1 | 3/2008 | Schneider | |
| 2008/0071883 A1 | 3/2008 | Alterman | |
| 2008/0120617 A1 | 5/2008 | Keller et al. | |
| 2008/0126232 A1 | 5/2008 | Lee | |
| 2008/0141237 A1 | 6/2008 | Elad et al. | |
| 2008/0147856 A1 | 6/2008 | Lee et al. | |
| 2008/0177994 A1 | 7/2008 | Mayer | |
| 2008/0182561 A1 | 7/2008 | Kim et al. | |
| 2008/0201410 A1 | 8/2008 | Adelman et al. | |
| 2008/0201413 A1 | 8/2008 | Sullivan et al. | |
| 2008/0201421 A1 | 8/2008 | Adelman et al. | |
| 2008/0201466 A1 | 8/2008 | Adelman et al. | |
| 2008/0201473 A1 | 8/2008 | Adelman et al. | |
| 2008/0229430 A1 | 9/2008 | Kargman | |
| 2008/0235289 A1 | 9/2008 | Carnes et al. | |
| 2008/0243536 A1 | 10/2008 | Dworkin et al. | |
| 2008/0243634 A1 | 10/2008 | Dworkin et al. | |
| 2008/0256553 A1 | 10/2008 | Cullen | |
| 2008/0270418 A1 | 10/2008 | Chen et al. | |
| 2008/0282338 A1 | 11/2008 | Beer | |
| 2008/0288300 A1 | 11/2008 | Emling et al. | |
| 2008/0294479 A1 | 11/2008 | Emling et al. | |
| 2008/0294768 A1 | 11/2008 | Sampson et al. | |
| 2009/0007229 A1 | 1/2009 | Stokes | |
| 2009/0016522 A1 | 1/2009 | Torres et al. | |
| 2009/0038007 A1* | 2/2009 | Ahn et al. | 726/21 |
| 2009/0042537 A1 | 2/2009 | Gelbman et al. | |
| 2009/0048712 A1 | 2/2009 | Rosenblum | |
| 2009/0055506 A1 | 2/2009 | Hudson et al. | |
| 2009/0070533 A1* | 3/2009 | Elazary et al. | 711/133 |

(56) References Cited

U.S. PATENT DOCUMENTS

| | | | |
|---|---|---|---|
| 2009/0094379 A1 | 4/2009 | Lu et al. | |
| 2009/0113068 A1* | 4/2009 | Fujihira et al. | 709/231 |
| 2009/0132487 A1 | 5/2009 | Lev | |
| 2009/0150527 A1 | 6/2009 | Tripathi et al. | |
| 2009/0157882 A1 | 6/2009 | Kashyap | |
| 2009/0248595 A1 | 10/2009 | Lu et al. | |
| 2009/0254610 A1 | 10/2009 | Arthursson | |
| 2009/0272799 A1 | 11/2009 | Skor et al. | |
| 2009/0276771 A1 | 11/2009 | Nickolov et al. | |
| 2009/0300407 A1 | 12/2009 | Kamath et al. | |
| 2009/0313320 A1 | 12/2009 | Parsons et al. | |
| 2009/0313321 A1 | 12/2009 | Parsons et al. | |
| 2009/0313363 A1 | 12/2009 | Parsons et al. | |
| 2009/0313364 A1 | 12/2009 | Parsons et al. | |
| 2010/0027420 A1 | 2/2010 | Smith | |
| 2010/0042487 A1 | 2/2010 | Barazani | |
| 2010/0106691 A1 | 4/2010 | Preslan et al. | |
| 2010/0114739 A1 | 5/2010 | Johnston | |
| 2010/0125473 A1 | 5/2010 | Tung et al. | |
| 2010/0306122 A1 | 12/2010 | Shaffer et al. | |
| 2010/0306267 A1 | 12/2010 | Zamoff et al. | |
| 2010/0332456 A1 | 12/2010 | Prahlad et al. | |
| 2010/0332818 A1 | 12/2010 | Prahlad | |
| 2010/0333116 A1 | 12/2010 | Prahlad et al. | |
| 2011/0055249 A1 | 3/2011 | Consuegra et al. | |
| 2011/0087690 A1 | 4/2011 | Cairns | |
| 2011/0093769 A1 | 4/2011 | Dunn et al. | |
| 2011/0161291 A1 | 6/2011 | Taleck et al. | |
| 2012/0041842 A1 | 2/2012 | Adelman et al. | |
| 2012/0114191 A1 | 5/2012 | Bladel et al. | |
| 2012/0131096 A1* | 5/2012 | Bugenhagen | 709/203 |
| 2012/0254194 A1* | 10/2012 | Wu | 707/747 |
| 2013/0046973 A1* | 2/2013 | Resch et al. | 713/156 |
| 2014/0040331 A1* | 2/2014 | Takaoka et al. | 707/827 |
| 2014/0040346 A1* | 2/2014 | Yanagihara et al. | 709/203 |

OTHER PUBLICATIONS

Microsoft01; "Static routing design considerations"; Jan. 21, 2005; www.microsoft.com; pp. 1-2.

Solaris03; "System Administration Guide: Solaris Containers—Resource Management and Solaris Zones"; Jan. 2005; Sun Microsystems Inc; pp. 1-334.

Peterson, cPanel User Guide and Tutorial, Packt Publishing, All, Mar. 2006.

Getting Started with Windows Shared Hosting, Version 2.1, Apr. 9, 2007.

Plesk 8.3 for Windows Administrator's Guide, SWsoft Holdings, Ltd, Revision 1.0, 2007, All Pages.

PHP-Nuke: Management and Programming, Revision 2.1, 2005, All Pages.

Microsoft looks ahead, Magazine, eWeek, Mar. 3, 2008, pp. 14-15.

Getting Started with Linux Shared Hosting, Dec. 7, 2006.

IBM Cloud Computing Version 1.0, Oct. 8, 2007.

About MogileFS http://www.danga.com/mogilefs/.

Zenel, A General Purpose Proxy Filtering Mechanism Applied to the Mobile Environment, Wireless Network, vol. 5, Issue 5, Oct. 1999, pp. 391-409.

Zenel, A General Purpose Proxy Filtering Mechanism Applied to the Mobile Environment, 1997.

Zenel, A Proxy Based Filtering Mechanism for the Mobile Environment, Doctoral Thesis, Columbia University, 1998.

Microsoft Computer Dictionary, 5th Edition, 2002, p. 383.

CertaintySolutions; "Understanding DNS: How to Register for, Configure, and Change DNS Service"; Sep. 2000; Certainty Solutions Inc; pp. 1-7.

Huang et al.; Design of Privacy-Preserving Cloud Storage Framework; Grid and Cooperative Computing (GCC), 2010 9th International; Nov. 1-5, 2010; pp. 128-132.

www.GoDaddy.com screen shot, Dec. 6, 2002.

GoDaddy.com screen shot, http://web.archive.org/web/20030401091726/www.godaddy.com/gdshop/default.asp?e=com.

* cited by examiner

Routing Table – 112

Arizona -> 1st IP Address
Texas -> 1st IP Address
Canada -> 1st IP Address

Germany -> 2nd IP Address
Russia -> 2nd IP Address
Egypt -> 2nd IP Address

FIG. 2

Routing Table – 112

| Behavior | Client Geographic Region | Responding IP Address |
|---|---|---|
| Off | 1st Geographic Region | Origin Server IP Address |
| Primary | 1st Geographic Region | 1st IP Address |
| Backup | 1st Geographic Region | Backup 1st IP Address |
| Off | 2nd Geographic Region | Origin Server IP Address |
| Primary | 2nd Geographic Region | 2nd IP Address |
| Backup | 2nd Geographic Region | Backup 2nd IP Address |

FIG. 5

Routing Table – 112

CDN No.: 1

Geographic Region 1 -> 1st IP Address
Geographic Region 2 -> 1st IP Address
Geographic Region 3 -> 1st IP Address Geographic Region 4 -> 2nd IP Address
Geographic Region 5 -> 2nd IP Address
Geographic Region 6 -> 2nd IP Address Routing Table – 112

CDN No.: 2

Geographic Region 7 -> 3rd IP Address
Geographic Region 8 -> 3rd IP Address
Geographic Region 9 -> 3rd IP Address Geographic Region 10 -> 4th IP Address
Geographic Region 11 -> 4th IP Address
Geographic Region 12 -> 4th IP Address

FIG. 8

CONFIGURING A CACHED WEBSITE FILE REMOVAL USING A PULLED DATA LIST

CROSS REFERENCE TO RELATED PATENT APPLICATIONS

This patent application is related to U.S. patent application Ser. No. 13/772,024 entitled: "CONFIGURING AN ORIGIN SERVER CONTENT DELIVERY USING A PULLED DATA LIST" concurrently filed herewith and also assigned to Go Daddy Operating Company, LLC.

This patent application is a continuation-in-part of, based on, and claims priority to U.S. patent application Ser. No. 13/746,624 entitled: "METHOD FOR TESTING METHOD OF ACCELERATING CONTENT DELIVERY," filed on Jan. 26, 2013, which is a continuation-in-part of, based on, and claims priority to U.S. patent application Ser. No. 13/685,127 entitled: "DNS OVERRIDING-BASED METHODS OF ACCELERATING CONTENT DELIVERY," filed on Nov. 26, 2012, and is a continuation-in-part of, based on, and claims priority to U.S. patent application Ser. No. 13/685,245 entitled: "SYSTEMS FOR ACCELERATING CONTENT DELIVERY VIA DNS OVERRIDING" filed Nov. 26, 2012, all of which are assigned to Go Daddy Operating Company, LLC.

FIELD OF THE INVENTION

The present inventions generally relate to delivering website content and, more particularly, systems and methods for pulling information from a database on a central software to configure a website running on a server computer to: enable a developer mode for the website; or to clear a cache for the website on the server computer.

SUMMARY OF THE INVENTION

An example embodiment of a system and method for configuring an origin server website content delivery using a server computer may comprise the steps of a server computer communicating, over a communications network and from the server computer, a request for a data list generated from at least one job record; analyzing the data list received over the communications network to identify a website for which to configure the server computer for a developer mode; updating a server configuration file for the server computer to identify at least one website in the data list configured for the developer mode; receiving at least one hypertext transfer protocol (HTTP) request for a website content for the at least one website; and in response to the at least one HTTP request and for each of the at least one website identified in the server configuration file as configured for the developer mode, directly routing, from the server computer, the at least one HTTP request for the website content to an origin server without caching the website content on, or serving the website content from, a cache within the server computer.

An example embodiment of a system and method for generating a data list of websites to configure for an origin server website content delivery using a server computer may comprise the steps of a server computer communicating, over a communications network, a request to configure a website for a developer mode on at least one server computer coupled to the communications network; writing to a database coupled to the communications network, a job record for the request; receiving a request by the at least one server computer for the data list of websites to configure for the developer mode; querying the database for at least one job record comprising the job record for the request; receiving a query result comprising the at least one job record; and analyzing the query result to identify at least one website in the query result to add to the data list of websites to configure for the developer mode. The developer mode may directly route, from each of the at least one server computer, at least one HTTP request for a website content for each of the at least one website in the data list to an origin server without caching the website content on, or serving the website content from, a cache within the at least one server computer. The example embodiment of the method and system may further comprise transmitting, from the server computer, the data list to the at least one server computer.

An example embodiment of a system and method for configuring a server computer to clear a cache for a website may comprise the steps of a server computer communicating, over a communications network, a request for a data list generated from at least one job record. Each job record may identify a website for which to remove at least one website file stored in a cache on the server computer. Each job record identified may not be associated, in a database coupled to the communications network, with at least one job check in record in the database, and the job check in record may indicate that the at least one website file has previously been removed from the cache during a time interval. The method may further comprise the steps of the server computer analyzing the data list received over the communications network to identify the website for which to remove the at least one website file from the cache. Based on the previous step, the server computer may remove the at least one website file from the cache and transmit, to a central software running on another server computer, at least one instruction, to be executed by the other server computer, to write the at least one job check in record, associated with the at least one job record, to the database.

An example embodiment of a system and method for generating a data list of websites for which to clear a cache on at least one server computer coupled to a communications network may comprise the steps of a server computer communicating, over the communications network, a request to remove from the cache at least one website file for a website; writing to a database coupled to the communications network, a job record for the request; receiving a request by the at least one server computer for the data list of websites; and querying the database for at least one job record comprising the job record for the request. Each record may identify a website for which to remove at least one website file stored in a cache within the server computer; and may not be associated, in the database, with at least one job check in record, the at least one job check in record indicating that the at least one website file has previously been removed from the cache during a time interval. The method may further comprise the steps of the server computer receiving, at the server computer, a query result comprising the at least one job record; analyzing the query result to identify at least one website in the query result to add to the data list of websites for which to remove the at least one website file from the cache; transmitting the data list to the at least one server computer; receiving at least one instruction from the at least one server computer to write, to the database, the at least one job check in record for the job record; and generating and writing the at least one job check record to the database.

The above features and advantages of the present inventions will be better understood from the following detailed description taken in conjunction with the accompanying drawings.

BRIEF DESCRIPTION OF THE DRAWINGS

FIG. 2 illustrates a possible embodiment of a routing table within a system for accelerating content delivery.

FIG. 5 is a flow diagram illustrating a possible embodiment of a routing table within a system for accelerating content delivery.

FIG. 8 is a possible embodiment of a routing table used within a system and method for accelerating content delivery.

DETAILED DESCRIPTION

Figure 1:
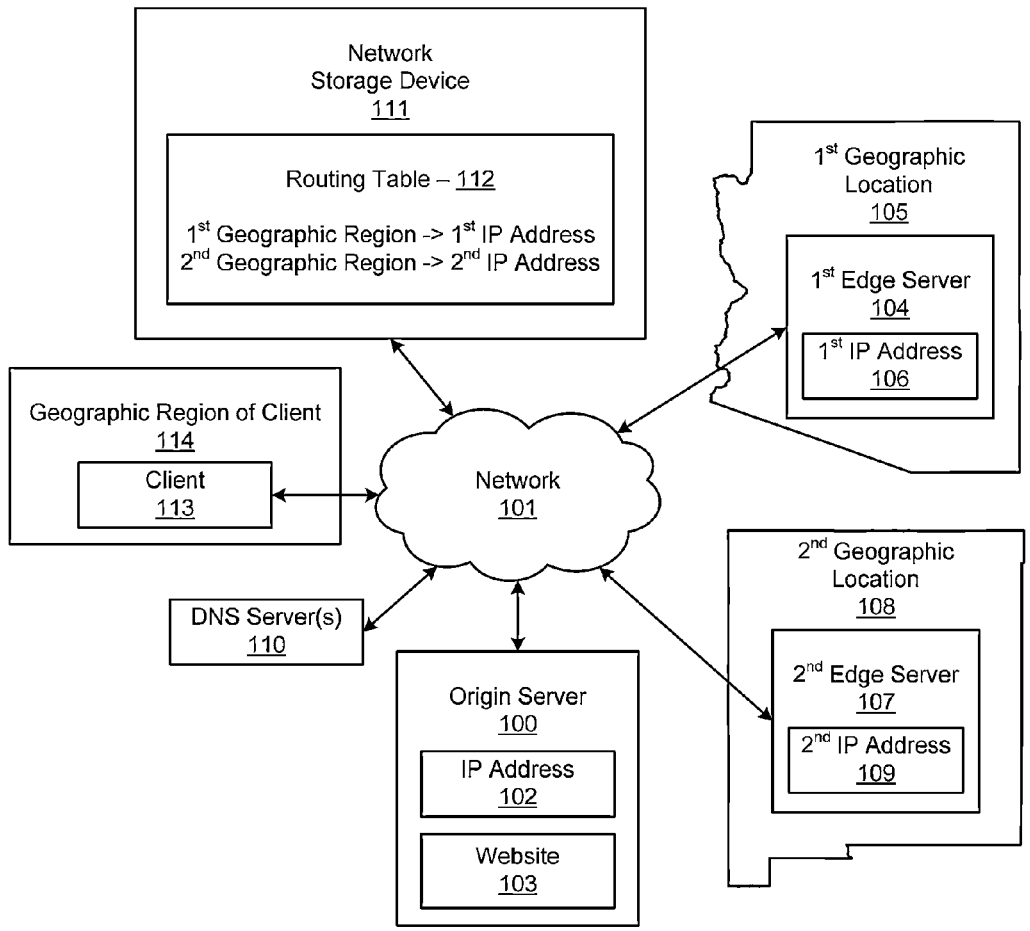
FIG. 1 illustrates a possible embodiment of a system for accelerating content delivery.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as websites. Websites comprise a collection of connected or otherwise related, web pages. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Menus and links may be used to move between different web pages within the website or to move to a different website as is known in the art. Websites may be created using Hyper Text Markup Language (HTML) to generate a standard set of tags that define how the web pages for the website are to be displayed. Such websites may comprise a collection of HTML and subordinate documents (i.e., files) stored on the Web that are typically accessible from the same Uniform Resource Locator (URL) and reside on the same server, although such files may be distributed in numerous servers.

Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other web pages at the same website or move to an entirely different website using the browser.

Browsers are able to locate specific websites because each website, resource, and computer on the Internet has a unique IP address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include an HTTP request combined with the website's Internet address, also known as the website's domain. An example of a URL with a HTTP request and domain is: http://www.companyname.com. In this example, the "http" identifies the URL as a HTTP request and the "companyname.com" is the domain.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

The DNS is the world's largest distributed computing system that enables access to any resource in the Internet by translating user-friendly domain names to IP Addresses. The process of translating domain names to IP Addresses is called name resolution. A DNS name resolution is the first step in the majority of Internet transactions. The DNS is a client-server system that provides this name resolution service through a family of servers called domain name servers. The hierarchical domain space is divided into administrative units called zones. A zone usually consists of a domain (e.g., example.com) and possibly one or more sub domains (e.g., projects.example.com, services.example.com). The authoritative data needed for performing the name resolution service is contained in a file called the zone file and the DNS servers hosting this file are called the authoritative name servers for that zone.

The DNS infrastructure consists of many different types of DNS servers, DNS clients, and transactions between these entities. An important transaction in DNS is the one that provides the core service of DNS (i.e., name resolution service) and is called the DNS query/response. A DNS query/response transaction is made up of a query originating from a DNS client (generically called a DNS resolver) and response from a DNS name server. In this way, the DNS serves as a global, distributed database. Name servers (serving zone files) each contain a small portion of the global domain space.

The DNS may be maintained by a distributed database system, which may use a client-server model. Specifically, clients may issue a query/request using a domain name and the DNS servers may receive the query/request originating from the client and resolve a domain name to an IP address for a website. The DNS may distribute the responsibility for assigning domain names and may map them to IP networks by allowing an authoritative name server for each domain to keep track of its own changes. Static addressing may be, but is not necessarily, used in some infrastructure situations, such as finding the DNS directory host that may translate domain names to IP addresses. Static addresses may also be used to locate servers or other network hardware inside a network environment such as the disclosed CDN.

A CDN may comprise a system of networked computers, servers, software and other networking components that work together transparently across a network to move content closer to end users for the purpose of improving performance and scalability. A CDN may include one or more network storage devices storing one or more routing tables, one or more origin servers, one or more edge servers and/or one or more DNS servers communicatively coupled to a network.

The origin server(s) may be any server that is "upstream," or higher in the hierarchy of servers or other network components within the network, based on the direction of resolution of a request or response. The edge server(s), possibly one or more clusters of edge servers, may include one or more servers in the CDN wherein software applications, data and/or other computer services have been pushed away from centralized points (such as origin server(s)) to the logical "edges" of the network. Using edge servers, information may be replicated across distributed networks of web servers.

In some CDN models, addressing and routing methodologies may be used to route packets to one or more potential "receiver" network components within a CDN. These addressing and routing methodologies may include "unicast" addressing and routing (a one-to-one association between a destination address and a single receiver endpoint), "broadcast" or "multicast" addressing and routing (a one-to-many association between a single sender and multiple simultaneous receiver endpoints) and "anycast" addressing and routing.

An anycast addressing and routing methodology may route packets from a single "sender" network component to the topologically nearest node in a group of potential "receivers" identified by the same destination address. Anycast may therefore be considered a one-to-one-of-many association. Because DNS is a distributed service over multiple geographically dispersed servers, an anycast routing methodology may be used to route packets to the IP addresses determined by the DNS system. These packets may be routed to the "nearest" point within the CDN announcing a given destination IP address.

As a non-limiting example, a network storage device (storing a routing table), one or more edge servers and one or more DNS servers may be hosted within a single data center. Upon receiving a request to resolve a domain name and/or to retrieve content for a website, the DNS server(s) may determine an IP address to which to route the request. Using an anycast address and routing methodology, the DNS server(s) may determine that the edge server(s) in the same data center comprise the "nearest" point within the CDN that announces the correct destination IP address, and may route the request to the edge server(s) within that data center accordingly. The edge server(s) within the data center may then receive the request and resolve the domain name and/or retrieve the website content accordingly.

Applicant has determined, however, that presently-existing DNS systems and methods using an anycast addressing and routing methodology do not provide optimal means for accelerating content delivery. As a non-limiting example, the request for domain name resolution and/or website content may be routed to a data center that comprises both DNS server(s) and edge server(s). As noted above, the DNS server(s) may use anycast to determine that the edge server(s) in the data center are the nearest point to the DNS server(s) announcing the destination IP address to resolve the request.

The DNS server(s) may make this determination because the DNS server(s) acts as the reference point to determine the "nearest" edge server(s) announcing the destination IP address. However, a second edge server, which also announces the destination IP address, may be running in a data center geographically closer to the requesting client and would provide optimal content delivery acceleration because of its proximity to the client, but may be running in a data center that does not include a DNS server. Because presently-existing DNS systems use the DNS server as the reference point for anycast addressing and routing, the edge server(s) within the data center that includes the DNS server(s) will be considered the "nearest" point, as opposed to the edge server(s) that are, in fact, the "nearest" point to the client that issued the request and that would therefore provide the optimal content delivery acceleration within the CDN.

Applicant has therefore determined that optimal content delivery may be accomplished by configuring a CDN to override the DNS system to route a request from a client to a geographically-proximal edge server.

Systems for Accelerating Content Delivery

FIG. 1 illustrates an embodiment of a system for accelerating content delivery by configuring a CDN to override the DNS system to route a request from a client to a geographically-proximal edge server. The CDN for the present inventions may comprise one or more clients 113, one or more network storage devices 111, one or more origin servers 100, a plurality of edge servers 104, 107 and/or a plurality of DNS servers 110 communicatively coupled to a network 101.

The example embodiments illustrated herein place no limitation on network 101 configuration or connectivity. Thus, as non-limiting examples, the network 101 could comprise the Internet, the public switched telephone network, the global Telex network, computer networks (e.g., an intranet, an extranet, a local-area network, or a wide-area network), wired networks, wireless networks, or any combination thereof. System components may be communicatively coupled to the network 101 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The one or more network storage devices 111 may store a routing table 112 for the CDN that maps one or more server IP addresses 106, 109 to each of one or more geographic regions, and may be configured to transmit the routing table 112 to any of the one or more servers, possibly to the plurality of DNS servers 110. The network storage device(s) 111 may be, as non-limiting examples, one or more routers, switches, servers, database servers or any other network 101 hardware or software capable of generating, storing and/or transmitting a routing table 112. The routing table(s) 112 may include one or more electronic tables, files and/or database objects that store the routes and/or metrics associated with those routes to particular network 101 destinations.

The routing table 112 may be stored within a database or other storage area in the network storage device 111 and/or within a database and/or cache of any networked computer or network component. The information on the routing table 112 may further include information about the utilization of the network 101 around it, as described herein. In one non-limiting example embodiment, the network storage device may comprise a database server running a database storing the routing table 112. Any database and/or data storage described herein may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

The one or more origin servers 100 may be any server that is "upstream," or higher in the hierarchy of servers or other network 101 components within the network 101, based on the direction of resolution of a request or response. The origin server(s) 100 may have an origin server IP address 102 and may host one or more websites 103. The website(s) 103 may comprise any collection of data and/or files accessible to a client 113 or server communicatively coupled to the network 101. As a non-limiting example, website(s) 103 may comprise a single webpage or multiple interconnected and related web pages, resolving from a domain name, each of which may provide access to static, dynamic, multimedia, or any other content, perhaps by accessing files (e.g., text, audio, video, graphics, executable, HTML, eXtensible Markup Language (XML), Active Server Pages (ASP), Hypertext Preprocessor (PHP), Flash files, server-side scripting, etc.) that enable the website 103 to display when rendered by a browser on a client 113 or server. The website's 103 files may be organized in a hosting server's file system that may organize the files for the storage, organization, manipulation, and retrieval by the hosting server's operating system. A hosting server's file system may comprise at least one directory that, in turn, may comprise at least one folder in which files may be stored. In most operating systems, files may be stored in a root directory, sub-directories, folders, or sub-folders within the file system.

The one or more edge servers 104, 107 may include one or more servers in the CDN wherein software applications, data and/or other computer services have been pushed away from centralized points (such as origin server(s) 100, for example) to the logical "edges" of the network 101. Using edge servers 104, 107, information may be replicated across distributed networks of web servers. The plurality of edge servers 104, 107 may include at least a first edge server 104 in a first geographic location 105 having a first IP address 106 and a second edge server 107 in a second geographic location 108 having a second IP address 109. Each IP address disclosed herein may be any IP address associated with network hardware or software within the network 101. As non-limiting examples, an IP address may be an origin IP address 102 associated with an origin server 100, a first IP address 106 associated with a first edge server 104 or a second IP address 109 associated with a second edge server 107. The routing table 112 on the network storage device 111 (or any other network device and/or software as disclosed herein) may likewise contain a route/path used to direct network traffic for an IP Address to the appropriate network hardware and/or software in the appropriate geographic region.

Any geographic region(s) and/or geographic location(s) disclosed herein may comprise, as non-limiting examples, a country, a state, a region of a country, a continent or a region of a continent. As non-limiting examples, the geographic location for each of the IP addresses for the client, the first, second or any additional edge server(s) 104, 107 or any other network hardware or software may be mapped to a geographic region including a country, a state, a region of a country, a continent or a region of a continent.

The one or more origin servers 100, the plurality of edge servers 104, 107, the plurality of DNS servers 110, the one or more database servers and/or any other server(s) described herein may comprise any computer or program that provides services to other computers, programs, or users either in the same computer or over a computer network 101. As non-limiting examples, the one of more servers could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

Any of these servers may comprise a computer-readable storage media storing instructions that, when executed by a microprocessor, cause the server(s) to perform the steps for which they are configured. Such computer-readable media may comprise any data storage medium capable of storing instructions for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions may, as non-limiting examples, comprise software and/or scripts stored in the computer-readable media that may be stored locally in the server(s) or, alternatively, in a highly-distributed format in a plurality of computer-readable media accessible via the network 101, perhaps via a grid or cloud-computing environment.

Such instructions may be implemented in the form of software modules. Any software modules described herein may comprise a self-contained software component that may interact with the larger system and/or other modules. A module may comprise an individual (or plurality of) file(s) and may execute a specific task within a larger software and/or hardware system. As a non-limiting example, a module may comprise any software and/or scripts running on one or more server(s) containing instructions (perhaps stored in computer-readable media accessible by the server computer's computer processor) that, when executed by the computer processor, cause the server computer to perform the steps for which it is configured.

The edge server(s) 104, 107 and the DNS server(s) 110 may comprise proxy servers and/or DNS proxy servers. These proxy servers may comprise one or more intermediary services between one or more servers and one or more clients 113. The proxy server(s) may be configured to accelerate hosting by caching the routing table 112 and/or web content for the website 103. As a non-limiting example, the one or more edge servers may comprise a caching proxy server that may cache the content of a website and/or a routing table. Responses to requests for actions by the one or more servers may be accelerated because caching the routing table 112 and/or the web content of the website 103 may eliminate computational overhead and network traffic created by one or more web servers on the edge servers fetching content from file storage on the origin server 100. The one or more proxy servers may also eliminate computational overhead and network traffic created by numerous calls to a database on the origin server 100.

The client(s) 113 may be any computer or program that provides services to other computers, programs, or users either in the same computer or over a computer network 101. As non-limiting examples, the client(s) 113 may be an application, communication, mail, database, proxy, fax, file, media, web, peer-to-peer, or standalone computer, cell phone, "smart" phone, personal digital assistant (PDA), etc. that may contain an operating system, a full file system, a plurality of other necessary utilities or applications or any combination thereof on the client 113. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

Client software may be used for authenticated remote access to one more hosting computers or servers, described herein. These may be, but are not limited to being accessed by a remote desktop program and/or a web browser, as are known in the art. Any browser described herein may comprise any software application for retrieving, presenting, and traversing information resources on the Web including, but not limited to, the website(s) 103 described in detail herein.

The DNS server(s) 110 may be configured to determine whether the domain name to be resolved is subscribed to the CDN. In some embodiments, this may be accomplished by querying a DNS zone file associated with the domain name to be resolved. A DNS zone file may comprise a text file that describes a DNS zone and comprises mappings between domain names and IP addresses and other resources. The DNS zone may comprise a subset (often a single domain) of the hierarchical domain name structure of the DNS. The DNS zone file may be a master file (authoritatively describing a zone) or may list the contents of a DNS cache. The starting point of each DNS zone may be specified though use of the $origin keyword within the zone file. The DNS zone file may be organized in the form of resource records (RR). Each DNS zone and/or RR may comprise several fields, possibly including type-specific data fields.

As a non limiting example, during or subsequent to a domain name registration, a request may be received to subscribe the domain name to one or more CDNs. The domain name may be added as a "zone" within a zone file. The zone for the domain name within the DNS zone file may be designated and marked as subscribing the domain name to the one or more CDNs (possibly by adding a type-specific data field to the DNS zone for the domain name), indicating that the registered domain name has been subscribed to the chosen CDN(s) and/or including information defining the CDN to which the domain name is subscribed.

The DNS zone may further comprise one or more address records used to resolve the domain name to a particular IP address. These records may be abbreviated as A-records for IPv4 IP addresses, or as AAAA-records for IPv6 IP addresses. In some embodiments, these address records may be used by the DNS server(s) 110 to determine the origin server IP address for the domain name. As a non-limiting example, the DNS server(s) 110 may be configured to query the DNS zone file for the origin server 100 IP address 102 for the domain name. The DNS server(s) 110 may isolate the DNS zone for the domain name, possibly using the $origin keyword within the zone for that domain name, and search the DNS zone for information about the domain name, possibly including the origin server 100 IP address 102 for the domain name, the A and AAAA-records for the domain name and any type-specific fields designating the domain name as subscribed to the CDN.

If the domain name is not subscribed to the CDN, the DNS server(s) 110 may respond to the request to resolve the domain name with the IP address 102 for the origin server 100. However, if the domain name is subscribed to the CDN, the DNS server(s) 110 may be configured to determine a geographic region 114 for the client 113.

In some embodiments, the DNS server(s) 110 may be configured to determine the geographic region 114 for the client 113 by performing an IP address geolocation on an IP address for any of the client, an ISP 400 for the client 113, or one or more other DNS server computers 110. This geolocation may comprise identification of the geographic location of the client 113, the client's ISP 400 or the other DNS server computer(s) 110 and associate this geographic location with an IP address, MAC address, image metadata, etc. by automatically looking up the IP address within a geolocation database that contains the IP address data used in firewalls, ad servers, routing, mail systems, web sites and other automated systems and retrieving a user's physical address. The IP address may also be associated with geographic region information such as country, region, city, state, postal/zip code, latitude, longitude, time zone, etc.

Figure 4:
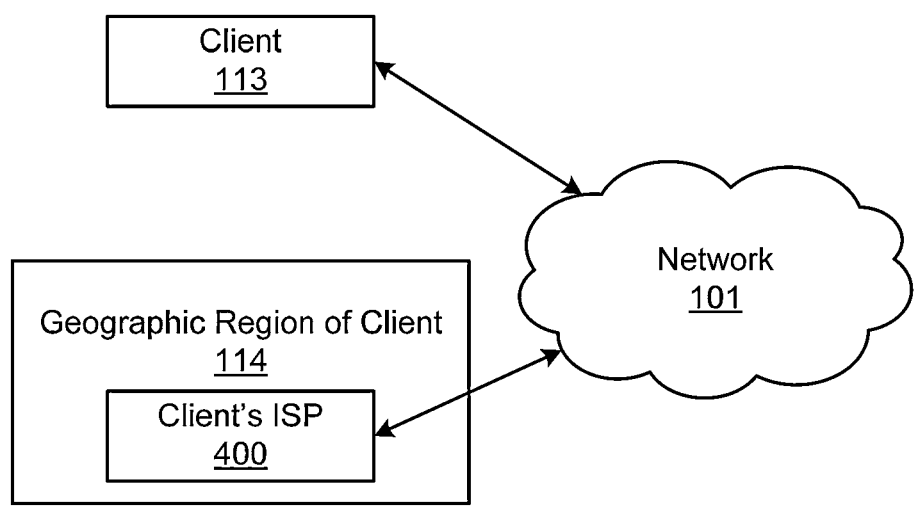
FIG. 4 illustrates a possible embodiment of a system for accelerating content delivery.

In some embodiments, the geolocation may be determined by obtaining the country code for a given IP address through a DNS-based Blackhole List (DSNBL)-style lookup from a remote server. Additional "deeper" data sets in a geolocation database may be used to determine other geolocation parameters such as domain name, connection speed, ISP, language, proxies, company name, etc. As seen in FIG. 4, the location may be the actual location of the client 113 performing the request or an actual assessed location. In this example embodiment, the client's ISP 440 may be used to determine the geographic region 114 of the client 113. In other embodiments, one or more other DNS server(s) 110 may be used to determine the geographic region 114 of the client 113.

If the geographic region 114 for the client 113 is mapped in the routing table 112 to a first IP address 106, the DNS server(s) 110 may be configured to respond to the request to resolve the domain name with the first IP address 106. Likewise, if the geographic region 114 for the client 113 is mapped in the routing table 112 to a second IP address 109, the DNS server(s) 110 may be configured to respond to the request to resolve the domain name with the second IP address 109.

FIG. 2 represents a non-limiting illustration of this functionality by the CDN. In this example, the routing table 112 comprises a first IP address 106 and a second IP address 109. Six geographic regions are represented in this example. Each of the first three geographic regions (Arizona, Texas and Canada) may represent a first geographic region 114 for a client 113 subscribed to the CDN that may be mapped to a first IP address 106 for a first edge server 104 at a first geographic location 105. Each of the second three geographic regions (Germany, Russia and Egypt) may represent a second geographic region 114 for a client 113 subscribed to the CDN that may be mapped to the second IP address 109 for a second edge server 107 at a second geographic location 108.

Figure 3:
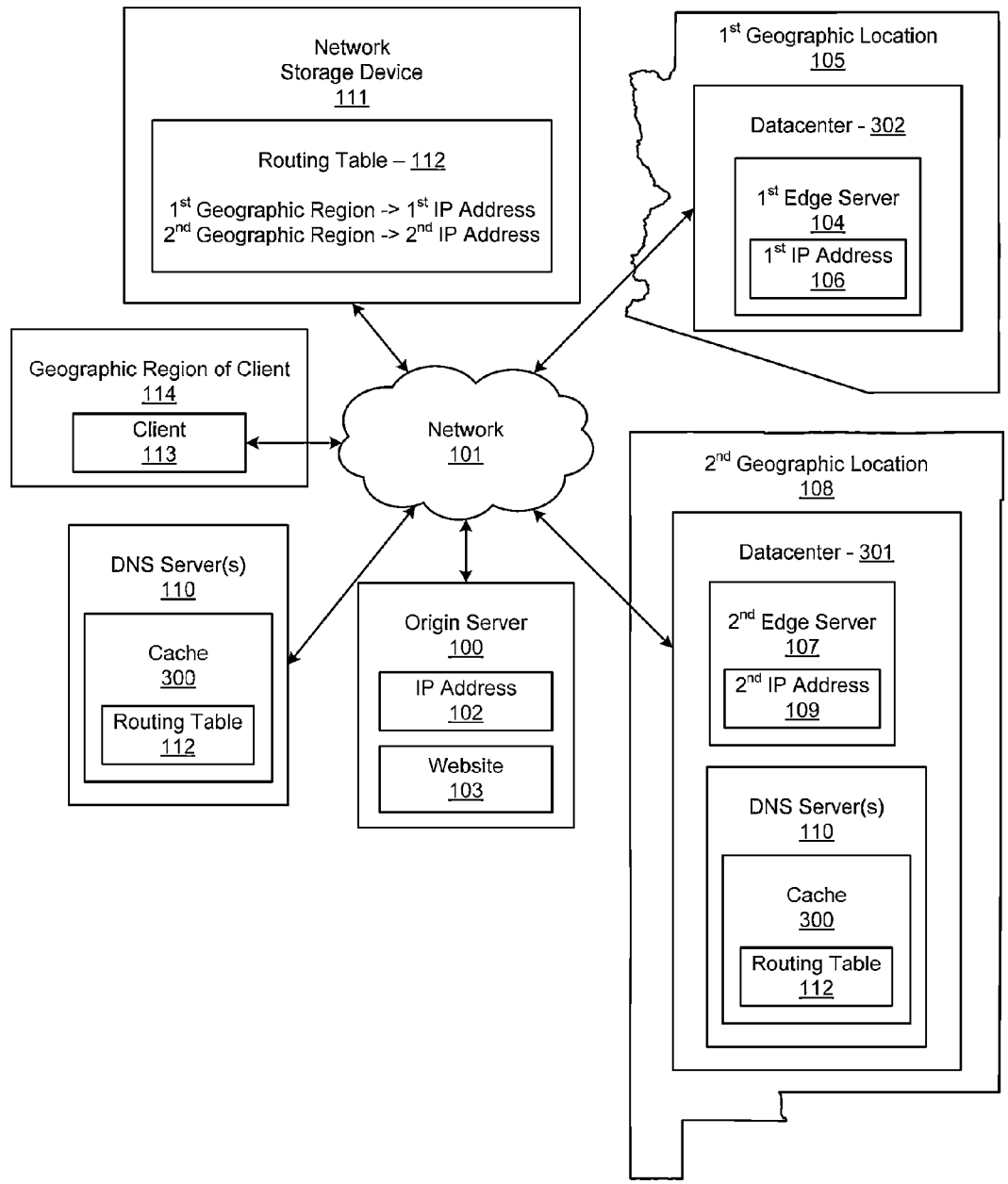
FIG. 3 illustrates a possible embodiment of a system for accelerating content delivery.

As seen in FIG. 3, each of the plurality of edge servers and each of the plurality of DNS server(s) 110 may be hosted in one or more data centers 301, 302. Although not shown in FIG. 3, the origin server(s) 100, any additional DNS server(s) 110 and/or database servers, the network storage device(s) 111 and/or any other server(s) and/or network hardware and/or software used by the CDN may also be hosted in one or more data centers such as the data center 302 in the first geographic region 105 or the data center 301 in the second geographic region 108.

The data center(s) may provide hosting services for websites, services or software relating to the domain information, or any related hosted website including, but not limited to hosting one or more computers or servers in the data center(s) as well as providing the general infrastructure necessary to offer hosting services to Internet or other network users including hardware, software, Internet web sites, hosting servers, and electronic communication means necessary to connect multiple computers and/or servers to the Internet or any other network.

A comparison of data center 301 and data center 302 in FIG. 3 illustrates that at least one of the plurality of edge servers (specifically first edge server 104) is running in a datacenter not comprising one of the plurality of DNS servers 110. In this example embodiment, datacenter 301 comprises both the second edge server 107 as well at least one of the plurality of DNS servers 110. By contrast, datacenter 302 comprises a datacenter running the first edge server 104, but does not comprise one of the plurality of DNS servers.

As a non-limiting example, the CDN may receive a request to resolve a domain name and/or retrieve cached web content from client 113 where the geographic region 114 of client 113 is in the same first geographic region 105 as datacenter 302, which is running edge server(s) 104, but does not comprise DNS server(s) 110.

From a content delivery acceleration perspective, the edge server 104 in datacenter 302 would be the optimal edge server to act as a proxy server to serve cached website 103 content to the client 113 that made the request, because of its physical proximity to the client 113. However, because data center 302 does not comprise DNS server(s) 110, the DNS will route the request to datacenter 301 in a second geographic location 108, which does comprise DNS server(s) 110. An anycast addressing and routing methodology, using DNS server(s) 110 in datacenter 301 as a reference point, may recognize a second edge server 107 as the "nearest" proxy server to DNS server(s) 110 with the desired website 103 content.

The disclosed invention provides methods and systems for configuring the CDN to override the DNS system to route a request from the client 113 to the nearest geographically-proximal edge server 104, 107. Specifically, the DNS server(s) 110 may be configured to receive, from a client 113 in a geographic region 114, the request to resolve a domain name to an IP address for a website 103, and if the domain name is subscribed to the CDN, the DNS server(s) 110 may be configured to determine the geographic region 114 for the client 113, and override the DNS system by responding to the request with an IP address 106, 109 to which the geographic region 114 of the client 113 is mapped in a routing table 112, thereby optimizing content delivery acceleration to the client 113.

Figure 6:
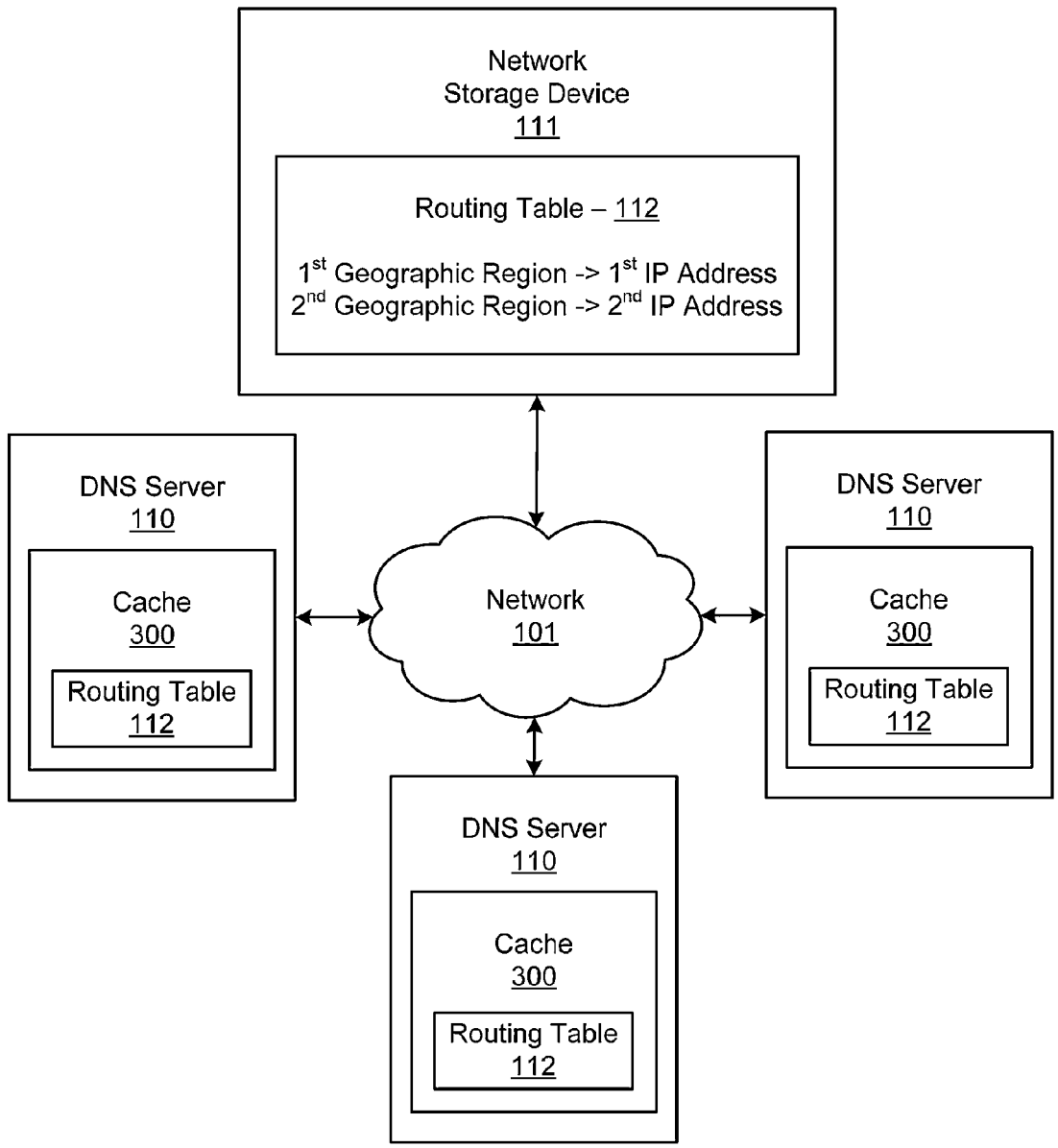
FIG. 6 is a flow diagram illustrating a possible embodiment of a system for accelerating content delivery.

FIGS. 3 and 6 show that network storage device 111, comprising a database server running a database storing the routing table 112, may be configured to generate and transmit the routing table 112 to the DNS server(s) 110 and periodically update the routing table 112 in the cache memory 300 of the DNS server(s) 110.

The network storage device 111, which may comprise a database server running a database storing at least the routing table 112, may be configured to generate the routing table 112 in several ways. As non-limiting examples, the CDN may comprise a provisioning system configured to extrapolate previously-entered information to determine the IP address(es) and the destination hardware resource(s) on which to instantiate the IP address(es). In some embodiments, the provisioning information may be extrapolated via static routing, which may include the use of fixed routes that may be manually entered by an administrator of a network into, for example, a network router or database server's configuration. Using this configuration information, all routing decisions may be predetermined and remain static. When network changes occur, the administrator may update the router configuration to include the changes. Static routing may be ideal in small network environments.

In other embodiments, the provisioning information may be extrapolated via routing protocols that gather and share the routing information used to maintain and update routing tables and that allow the network to dynamically adjust to changing conditions. This routing information may in turn be used to route a routed protocol to its final destination. A routing protocol may further be a formula used by routers or other network 101 components to determine the appropriate path onto which data should be forwarded and may specify how routers or other network 101 components report changes and share information with other routers or other network 101 components in a network 101 that they can reach.

Such routing protocols may include link state protocols (e.g., Open Shortest Path First or "OSPF" and Intermediate System to Intermediate System or "IS-IS"), which use link state routing to construct a map of the connectivity of the network, send information about each node's neighbors to the entire network and independently calculate the best next hop for each possible destination in the network. These routing protocols may also include distance-vector routing protocols (e.g., Routing Information Protocol or "RIP," Interior Gateway Routing Protocol or "IGRP," Exterior Gateway Protocol or "EGP" or Border Gateway Protocol or "BGP"), which have each node share its routing table with its neighbors to calculate paths using less computational complexity and message overhead. Routing protocols may be ideal in large network environments. The generation of the routing table 112 may therefore be the primary goal of routing protocols and static routes.

In still other embodiments described in more detail below, information for generating the routing table 112 may be queried or extrapolated from a DNS zone file. As a non-limiting example, if the routing table 112 is not cached on the DNS server(s) 110, the DNS zone file for the domain name may be fetched and data for the routing table 112 may be extracted or extrapolated from the DNS zone file. Such data may be extracted from the fields within the DNS zone for the domain name and may include, as non-limiting examples, the A and/or AAAA-records, the CDN the domain name is subscribed to, location information that the IP addresses are mapped to, etc.

In other words, the zone file may be used as a starting point for compiling the zone file data into database format. The routing table 112 and/or database may further be updated with additional information from the domain name zone and/or zone file. As a non-limiting example, each generated routing table 112 may comprise a CDN data field identifying the CDN to which each routing table 112 corresponds.

Once generated, the database server may be configured to transmit the routing table 112 to the DNS server(s) 110. In some embodiments, the database server may transmit the routing table 112 to the DNS server(s) 110 via a replication chain. Such replication may include a set of technologies for copying and distributing data and database objects from one database to another, possibly over local or wide area networks 101, such as the Internet, and synchronizing between databases to maintain consistency.

This replication may enable data from a master server, possibly a database server comprising a relational database, to be replicated to one or more slave servers, possibly additional database servers each comprising one or more relational databases. In some embodiments, where the databases change on a regular basis, the replication may be transactional replication. In this model a software agent and/or signal monitor may monitor the master database server, or "publisher" for changes in data and transmit those changes to the slave databases or "subscribers," either immediately or on a periodic basis.

As a non-limiting example in the context of the current embodiments, network storage device 111 may generate a routing table 112 and store it within a SQL database on the network storage device 111. The network storage device 111 may replicate the routing table 112 via a replication chain, to the DNS server(s) 110, each of which may temporarily store the routing table in a cache memory 300.

The database server may periodically update the routing table in the cache memory of the DNS server(s) 110. In some embodiments, this update may be responsive to a lost connection between the network storage device 111 (possibly acting as the database server) and the DNS server(s) 110. The loss of connection may be determined by a signal that may be a limited form of inter-process communication used as a notification sent to a process or to a specific thread within the same process in order to notify it of an event that occurred, in this case a connection loss or closed terminal. If the process has previously registered a signal handler, that routine is executed. Otherwise a default signal handler may be executed.

In some embodiments, the signal may be a hangup (possibly a SIGHUP) signal sent to or from a process on the network storage device 111 when a controlling, pseudo or virtual terminal has been closed (possibly due to a system shut down or reboot) between the network storage device 111 and the DNS server(s) 110. Thus, in response to a hangup signal, possibly a SQL hangup signal between the network storage device 111 and the SQL server(s) 110, the database server may be configured to run a process to update the routing table 112 in the cache memory 300 of the DNS server(s) 110.

In some embodiments that utilize a TCP "keepalive" parameter, the network storage device 111 comprising the database server and/or the DNS server(s) 110 may monitor a connection between them. If the keepalive parameter determines that this connection is no longer set to "on," this may be considered the "transaction" that causes the database server to refresh the routing table 112 stored on the DNS server(s) 110 with a new copy of the routing table 112 from the network storage device 111. This keepalive parameter may also be used to maintain a connection between the origin server 100 and the edge server(s) to accelerate delivery of dynamic content for the website 103.

FIG. 4 demonstrates that the request to resolve the domain name may be received by one of the DNS server(s) 110 directly from the client 113, an internet service provider 400 for the client 113 or one or more other DNS servers 110. Furthermore, FIG. 4 demonstrates that the geographic region 114 of the client 113 may be determined by performing an IP address geolocation on an IP address for the client 113. As seen in FIG. 4, this may include not only the client's actual location but also an actual assessed location. In this example embodiment, the client's ISP 400 may be used to determine the geographic region 114 of the client 113. In other embodiments, one or more other DNS server(s) 110 may be used to determine the geographic region 114 of the client 113.

FIG. 5 demonstrates an example routing table 112 used by the DNS server(s) 110 after determining whether domain name to be resolved is subscribed to a CDN. The routing table 112 may comprise a behavior field storing values for behaviors corresponding to a plurality of geographic regions 114 for the location of the client 113 that issued the request to resolve the domain name. The behavior for each of the client geographic regions may further correspond to a responding edge server's 104, 107 IP address 106, 107 for resolving the domain name and/or serving content for the requested website.

As a non-limiting example, if it is determined by the DNS server(s) 110 that the domain name is subscribed to a CDN, and further determined that the behavior field in the routing table 112 for the geographic location 114 for the client 113 comprises an "off" designation, the DNS server(s) 110 may be configured to respond to the request to resolve the domain name with an origin server computer 100 IP address 102 for the domain name. Using the example routing table 112 in FIG. 5, if the domain name is subscribed to the CDN, the client 113 requests resolution of the domain name from the first geographic region or second geographic region and the behavior for the client 113 at a location 105, 106 in either of these regions includes an "off" designation, the DNS server(s) 110 may resolve the domain name to content from the origin server 100.

Using the example routing table 112 in FIG. 5, if the domain name is subscribed to the CDN, the client 113 requests resolution of the domain name from the first geographic region and the behavior for the client 113 at a location in the first geographic region 105 includes a "primary" designation, the DNS server(s) 110 may resolve the domain name with a first primary IP address 106 for an edge server 104 in the first geographic region. Likewise, if the client 113 requests resolution of the domain name from the second geographic region and the behavior for the client 113 at a location 108 in the second geographic region includes a "primary" designation, the DNS server(s) 110 may resolve the domain name with a second primary IP address 109 for an edge server 107 in the second geographic region.

Using the example routing table 112 in FIG. 5, if the domain name is subscribed to the CDN, the client 113 requests resolution of the domain name from the first geographic region and the behavior for the client at a location 105 in the first geographic region includes a "backup" designation, the DNS server(s) 110 may resolve the domain name with a backup first IP address 106 for an edge server 104 in the first geographic region. Likewise, if the client requests resolution of the domain name from the second geographic region and the behavior for the client 113 at a location 108 in the second geographic region includes a "backup" designation, the DNS server(s) 110 may resolve the domain name with a second backup IP address 109 for an edge server 107 in the second geographic region.

FIG. 6 represents a highly distributed embodiment of the disclosed inventions. In these embodiments, the network storage device 111 may generate and transmit the routing table 112 to a plurality of DNS servers 110 each storing the received routing table 112 in a cache 300 as previously disclosed.

Thus, in the disclosed embodiments, the CDN may be configured to override the DNS system to route a request from a client 113 to a geographically-proximal edge server 104, 107. This may be accomplished according to the CDN environment depicted in FIGS. 1, 3, 4 and 6 using routing tables such as those depicted in FIGS. 2 and 5.

Methods for Accelerating Content Delivery

Figure 7:
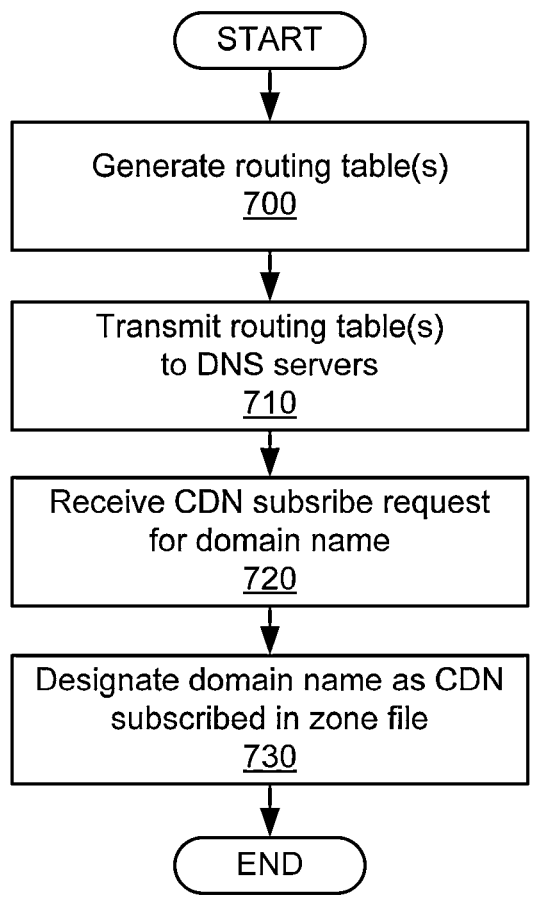
FIG. 7 is a flow diagram illustrating a possible embodiment of a method for accelerating content delivery.

FIG. 7 illustrates an embodiment of a method of accelerating content delivery, wherein the CDN is configured to override the DNS system to route a request from a client 113 to a geographically-proximal edge server 104, 107. This embodiment may comprise the steps of generating one or more routing tables 112 for one or more CDN (the routing table 112 mapping one or more edge server 104, 107 IP addresses 105, 109 to each of one or more geographic regions) (Step 700), transmitting the routing tables to the DNS server(s) 110 (Step 710) as described herein, and receiving a request to subscribe the domain name to a CDN (Step 720).

As non-limiting examples, the CDN subscribe request may be received from a registrant of a domain name as the domain name is registered with a registrar, and/or may be received from a website owner as the website is developed and/or hosted by a hosting provider. In some non-limiting embodiments, the request may be received via a "dashboard" or other control panel on a registrar and/or hosting provider website. After the CDN subscribe request is received, the DNS zone for the domain name may be updated to designate the domain name as CDN subscribed (Step 730).

FIG. 8 illustrates an example of a plurality of routing tables used to accelerate content delivery within a CDN. In this example embodiment, the step of at least one server computer generating a routing table (Step 700) may further comprise generating a second through an nth routing table 112 corresponding to a second through an nth CDN. Likewise, the step of transmitting the routing table 112 to the DNS server(s) 110 (Step 710) may further comprise the step of transmitting the second through the nth routing table 112 to the DNS server(s) 110.

This principle may be demonstrated as illustrated in FIG. 8, where a first routing table 112 for CDN 1 and a second routing table 112 for CDN 2 each have been generated. In this example embodiment, each routing table 112 may comprise a "CDN No." data field identifying the CDN to which each routing table 112 corresponds. The routing table 112 data for each CDN may further comprise one or more IP addresses within the CDN, and each of these IP addresses may be mapped to one or more geographic regions.

In FIG. 8, the routing table 112 data for CDN 1 may include a first and a second IP address 106, 109. The first IP address 106 may be mapped to Geographic Regions 1, 2 and 3 in the routing table 112 and the second IP address 109 may be mapped to Geographic Regions 4, 5 and 6 in the routing table 112. The routing table 112 data for CDN 2 may include a third and fourth IP address. The third IP address may be mapped to Geographic Regions 7, 8 and 9 in the routing table 112 and the fourth IP address may be mapped to Geographic Regions 10, 11 and 12 in the routing table 112.

Figure 9:
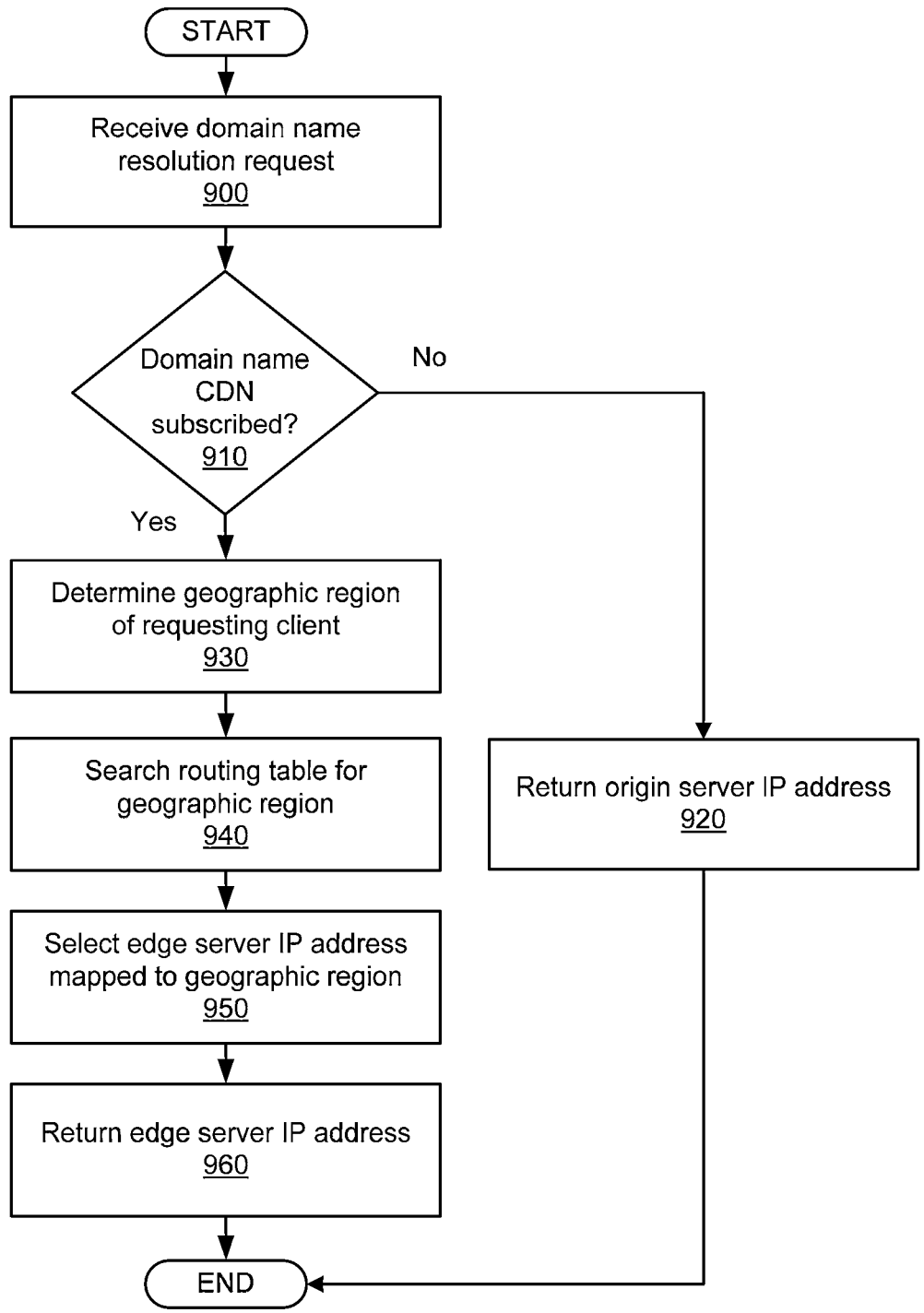
FIG. 9 is a flow diagram illustrating a possible embodiment of a method for accelerating content delivery.

FIG. 9 illustrates an alternate embodiment of a method of accelerating content delivery in a CDN. This embodiment may comprise the steps of one or more DNS servers 110 receiving a request from a client 113 to resolve a domain name to an IP address for a website (Step 900) and determining whether the domain name is subscribed to a CDN (Step 910). If the domain name is determined not to be subscribed to the CDN, the request to resolve the domain name may be responded to and return an origin server 100 IP address 102 for the domain name (Step 920).

As seen in FIG. 9, if the domain name is determined to be subscribed to a CDN, further steps may comprise the DNS server(s) 110 determining the geographic region 114 of the requesting client 113 (Step 930), searching a routing table 112 that maps one or more edge server 104, 107 IP addresses 106, 109 to each of one or more geographic regions, for the geographic region for the client 113 (Step 940), selecting an edge server 104, 107 IP address 106, 109 mapped in the routing table 112 to the geographic region 114 for the client 113 (Step 950) and responding to the request to resolve the domain name by returning the IP address 106, 109 for the edge server 104, 107 (Step 960).

Figure 10:
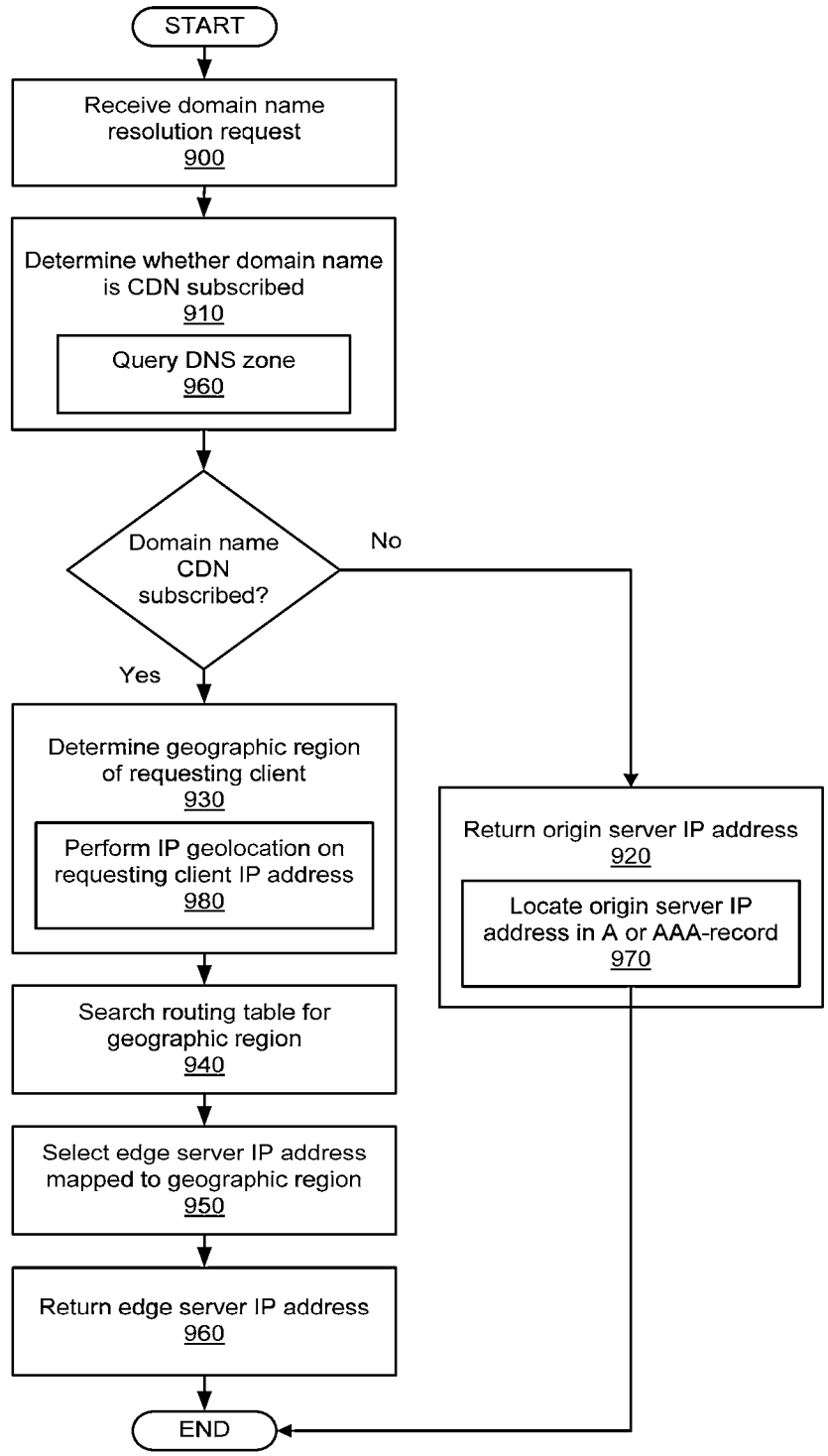
FIG. 10 is a flow diagram illustrating a possible embodiment of a method for accelerating content delivery.

FIG. 10 illustrates an alternate embodiment of a method of accelerating content delivery in a CDN wherein: the step of determining whether the domain name is subscribed to a CDN (Step 910) further comprises the step of querying the DNS zone (possibly within the DNS zone file) for the domain name to determine if the DNS zone has been marked for and/or is subscribed to any of one or more CDNs; the step of identifying, locating and/or returning the origin server 100 IP address 102 (Step 920) further comprises the step of locating the origin server 100 IP address 102 in the A or AAAA-record of the DNS zone for the domain name and/or the routing table 112 (Step 970); and the step of determining the geographic region of the requesting client 113 (Step 930) further comprises the step of performing an IP geolocation on the requesting client 113 IP address (Step 980) as disclosed herein.

Figure 11:
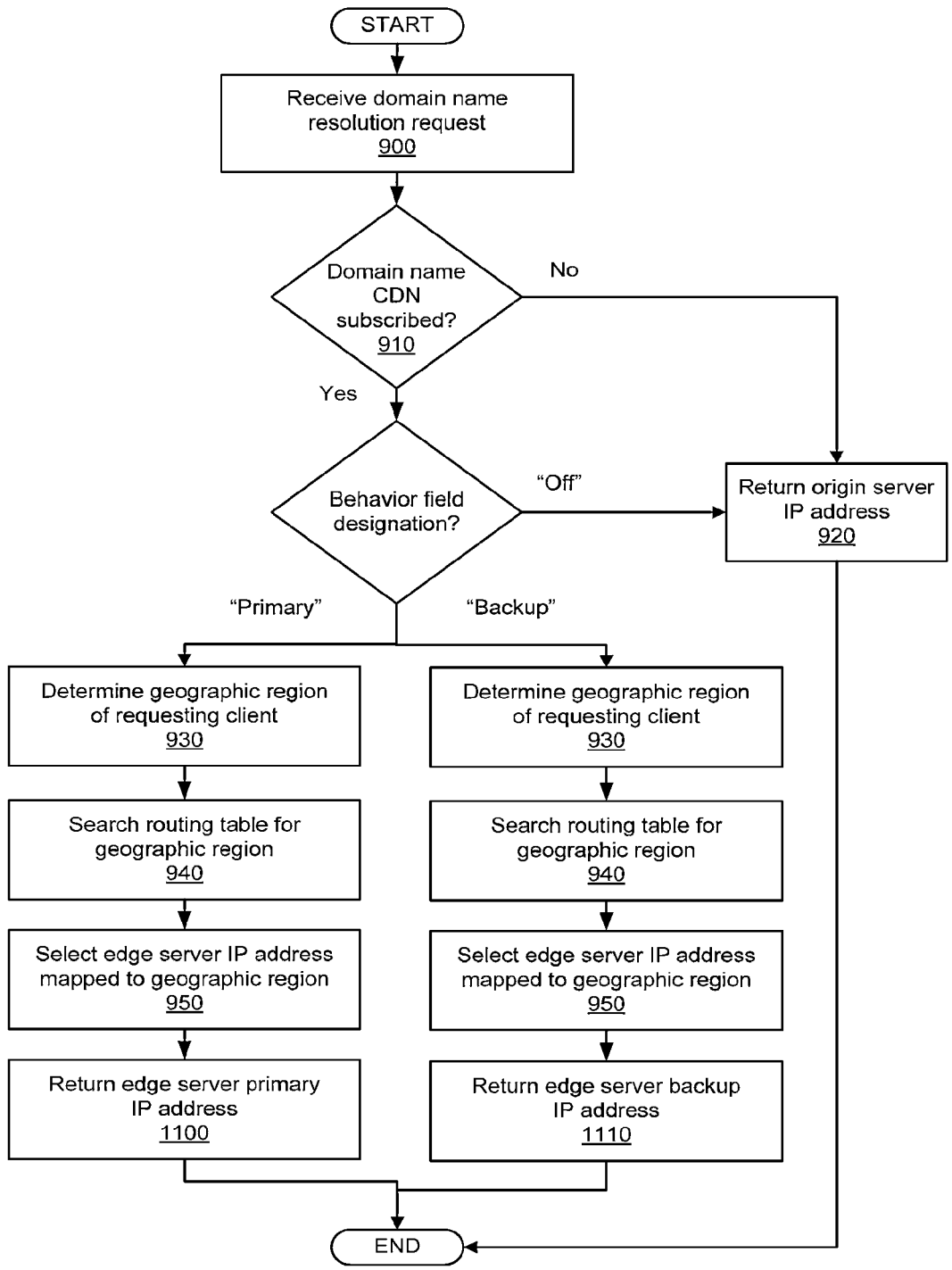
FIG. 11 is a flow diagram illustrating a possible embodiment of a method for accelerating content delivery.

FIG. 11 illustrates an alternate embodiment of a method of accelerating content delivery in a CDN further comprising: subsequent to the step of determining whether the domain name is CDN subscribed (Step 910), determining a behavior field designation in the routing table 112 for the geographic region for the IP address. If the behavior designation is "Off," the origin server 100 IP address 102 may be returned. Regardless of whether the behavior field designation is "Primary" or "Backup," the steps of determining a geographic region 114 of the requesting client 113 (Step 930), searching a routing table 112 for the geographic region (Step 940) and selecting an edge server 104, 107 IP address 106, 109 mapped to the geographic region (Step 950) may be performed. If the behavior field designation is "Primary," the edge server 104, 107 primary IP address may returned (Step 1100) and if the behavior field designation is "Backup," the edge server 104, 107 backup IP address may be returned (Step 1110).

Example Use of Systems and Methods for Accelerating Content Delivery

Figure 12:
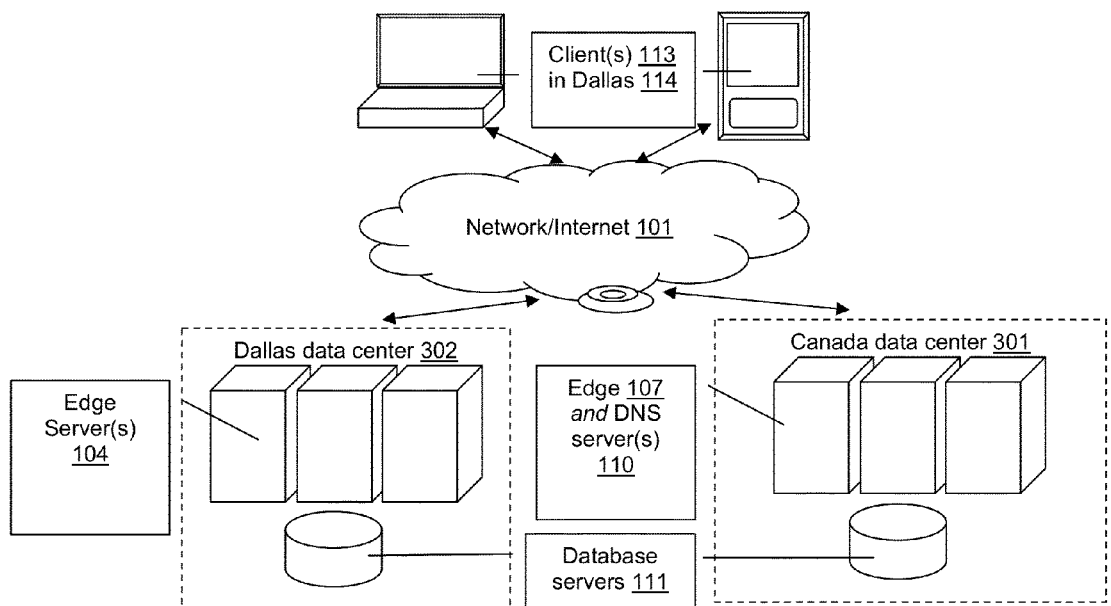
FIG. 12 is an example embodiment of a system for registering a domain name with a domain name registrar communicatively coupled to the Internet.

As seen in the non-limiting example embodiment in FIG. 12, after registering a domain name (e.g., example.com) with a domain name registrar, a registrant may develop a website 103 and pay a hosting provider to host the website 103 on the hosting provider's hosting servers, which are communicatively coupled to the Internet. As a non-limiting example, the domain name registrar and hosting provider may be a single service provider, such as GODADDY.COM.

During the domain name registration and website hosting process, example.com's registrant may choose to subscribe example.com to one or more CDNs. The appropriate information for the registered domain name may be updated in the DNS. Specifically, the appropriate DNS zone file(s) may be updated to include a DNS zone for example.com. This information may include the domain name, the A and/or AAAA-records and a designation that the domain name is subscribed to one or more CDNs as follows:

| | | |
|---|---|---|
| $ORIGIN example.com. | ; start of this zone file in the namespace | |
| example.com. IN | ; example.com used on Internet | |
| example.com NS ns | ; ns.example.com is a name server for example.com | |
| example.com A 192.0.2.1 | ; IPv4 address for example.com | |
| example.com AAAA 2001:db8:10::1 | ; IPv4 address for example.com | |
| www. CNAME example.com | ; www.example.com is an alias for example.com | |
| CDN 01 example.com. | ; example.com is marked as subscribed to CDN01. | |

One or more DNS servers 110 within CDN01 may use the DNS zone file, any previously entered static routes and/or any existing routing protocols, possibly within a provisioning system in the CDN, to generate a routing table 112. The routing table 112 may include at least the following information:

| CDN | Behavior | Location | A | A-Backup |
|---|---|---|---|---|
| 01 | Off | Default-Phoenix | 70.1.1.1&2 (phx cdn) | 60.1.1.1&2 (dal cdn) |
| 01 | Primary | Default-Texas | 60.1.1.1&2 (dal cdn) | 50.1.1.1&2 (can cdn) |
| 01 | Backup | Default-Canada | 50.1.1.1&2 (can cdn) | 60.1.1.1&2 (dal cdn) |

This routing table may be replicated, possibly via a replication chain, to the DNS server(s) 110 within the CDN and may be temporarily stored in cache memory in the DNS server(s) 110. The network 101 hardware and software used to replicate the routing table 112 may be configured to keep the replicated data synchronized and up to date, possibly by transmitting new copies of the replication table 112 to the DNS server(s) 110. If a hangup signal is detected (indicating there has been a loss of connection between the master copy of the routing table 112 and the replicated data for the routing table 112), the replicated data may be refreshed and/or re-transmitted to the DNS server(s) 110 so that the data remains current.

A client computer, for example, in the Dallas, Tex. area, may request content from the website 103, possibly using an HTTP and/or TCP request, to resolve the example.com to the website 103. The DNS server(s) 110 may perform an IP geolocation to determine the geographic location (in this case, Dallas) of the client 113, the ISP of the client 400 or another DNS server 110 associated with the client 113 that issued the request.

In response to this request, the CDN (possibly via the DNS server(s) 110) may query the routing table 112 stored within a database on a database server (possibly running on network storage device 111) or within the cache of the DNS server(s) 110, for a behavior, an address record, a backup address record or any other routing data corresponding to the CDN for example.com and Dallas, Tex., the location of the client. As a non-limiting example, the DNS server(s) 110 may query the routing table 112 using the following SQL query: "SELECT Behavior, A, A-Backup FROM tbl WHERE Location=CC OR Location=Default-Dallas ORDER BY Location=CC DESC LIMIT 1."

In alternate examples, if the DNS proxy server(s) 110 determines that no routing table was cached, the DNS proxy(s) 110 may fetch the appropriate DNS zone/zone file for example.com, possibly via an SQL request. If the DNS server(s) 110 search the routing table 112 and/or a DNS zone for example.com and determine that example.com is not mapped to a corresponding CDN, the request may be routed to the origin server 100 for example.com.

Returning to the example comprising a cached routing table 112 wherein example.com is subscribed to a CDN, the DNS server(s) may determine, using the data in the routing table 112, that example.com is subscribed to CDN01. The DNS server(s) 110, having determined that the client sending the request is in Dallas, Tex. and that example.com is subscribed to CDN01, may respond to the request using the stored routing data within the example routing table 112. Specifically, the geographic region 114 for the client 113 is Dallas, Tex., so the DNS server(s) 110 may use the routing table 112 to respond to the client's 113 request using IP Address 60.1.1.1&2 mapped to an edge server containing the website 103 content in the "Default-Texas" geographic area.

The DNS server(s) 110 may further determine how to respond to the request using data from the "Behavior" data field within the routing table 112 to. In this example, for requests that correspond to the behavior data field with an "off" designation, the DNS server(s) 110 may respond to the request to resolve the domain name with an origin server IP address—the Phoenix origin server in this example. For requests that correspond to the behavior data field with a "primary" designation, the DNS server(s) 110 may respond to the request to resolve the domain name with a primary IP address for an edge server—the Texas edge server in this example. For requests that correspond to the behavior data field with a "backup" designation, the DNS server(s) 110 may respond to the request to resolve the domain name with a backup IP address for an edge server—the Canada edge server in this example.

Testing and Reporting on Accelerated Content Delivery

The above-described systems and methods can be utilized to provide a broad range of functionality and improved performance over traditional systems and methods. Though the benefits of the above-described systems and methods may be understood and appreciated by those individuals having an exceptional experience base or an exceptional understanding of the complex systems and methods utilized to yield the above-described benefits, others without the requisite knowledge may not fully appreciate the full scope of benefits. Additionally or alternatively, despite being able to readily appreciate such benefits, it may be difficult for an end user to accurately quantify the benefits of the above-described systems and methods. As a non-limiting example, benefit quantification or detailed comparisons may be useful to comparative consumers or for businesses in desiring to quantify, track, and account for investments and returns on investments.

Figure 13A:
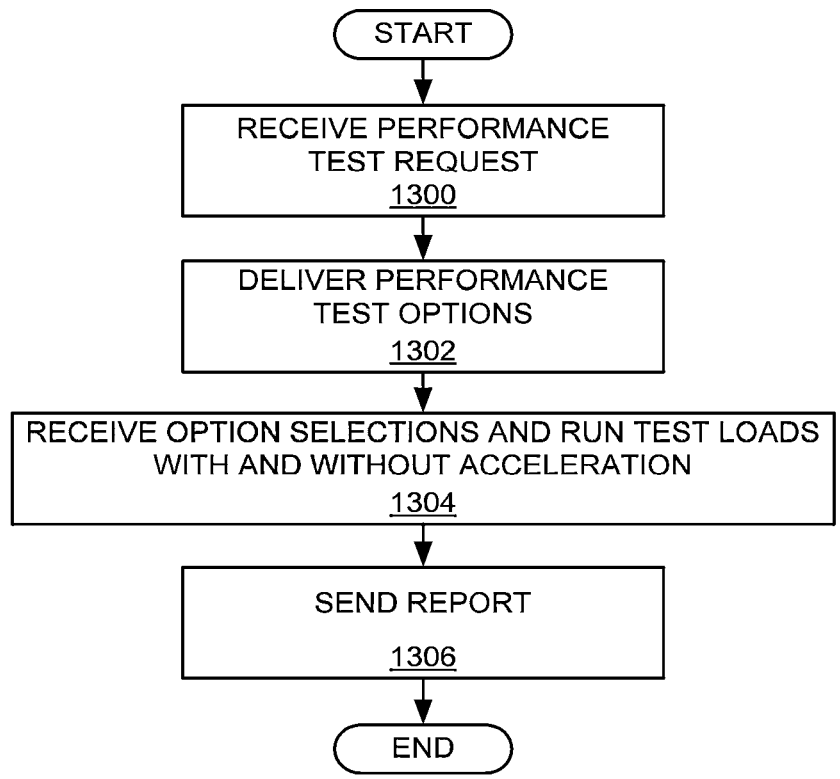
FIG. 13A is a flow diagram illustrating a possible embodiment of a method for measuring and comparing the speed of a given site with and without accelerating content delivery.

To this end, the present disclosure provides systems and methods for communicating benefits of the above-described systems and methods to customers and potential customers. Referring to FIG. 13A, an embodiment of a method of communicating benefits of accelerating content delivery in a CDN will be described. The following steps are readily applicable to any of the above-described methods for accelerating content delivery. For example, as described above with respect to FIG. 7, the present steps may be used when the CDN is configured to override the DNS system to route a request from a client 113 to a geographically-proximal edge server 104, 107. Likewise, as described above with respect to FIGS. 9, 10, and 11, the present steps may be used when the DNS server(s) 110 determines the geographic region 114 of the requesting client 113, searches a routing table 112 for the geographic region for the client 113, and selects an edge server 104, 107 IP address 106, 109 mapped in the routing table 112 to the geographic region 114 for the client 113.

Figure 13B:
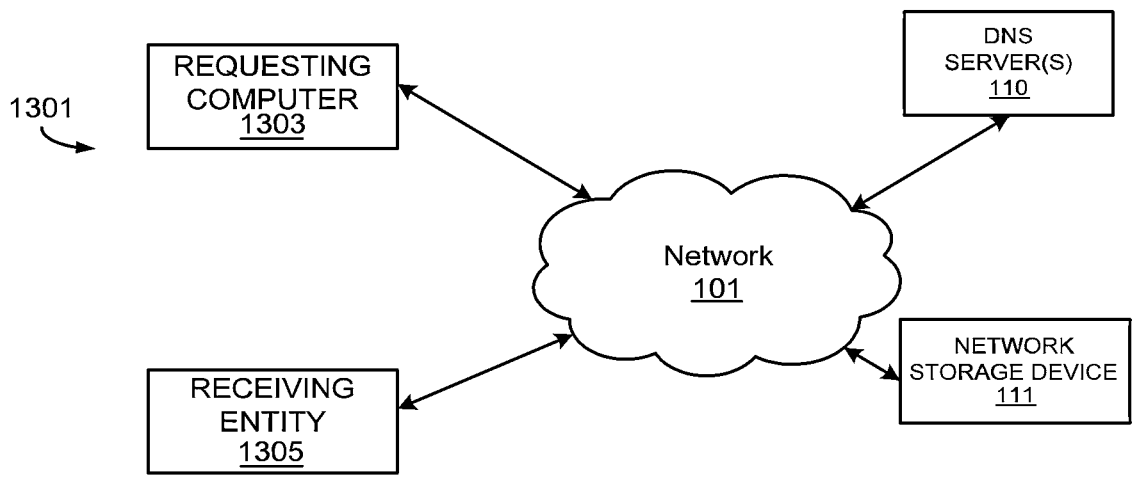
FIG. 13B is a possible embodiment of a system for testing accelerated content delivery.

Specifically, referring to FIGS. 13A and 13B a performance test or performance demonstration request is received (Step 1300) through a performance testing platform 1301. This request may be communicated by a requesting client computer 1305 that has not yet purchased accelerated content delivery or has purchased accelerated content delivery, but would like to quantify acceleration under current configurations or consider purchasing additional or different acceleration, for example using additional or different configurations. The request is communicated over the network 101 and may be received by any of a plurality of entities having receiving entity computers 1305. As a non-limiting example, the request may be received by the CDN, the DNS server(s), or a services provider or services retailer. A services provider or services retailer may include an entity that provides any of a wide-variety of services, which may or may not include or be limited to those systems and methods described above. Likewise, a services retailer may include an entity that simply sells but does not provide any of the above-described or related services.

In response to receiving a request for a performance test, a variety of performance test options may be communicated back to the requesting entity (Step 1302). As a non-limiting example, the requesting entity may be given the option to select from a variety of geographic locations or potential geographic locations. Likewise, the requesting entity may be given the option to select between different ones of the above-described options for implementing accelerated content delivery. Further still, the requesting entity may be given the option to select between different potential CDNs.

Upon receiving the selected options, the receiving entity runs test loads with and without acceleration (Step 1304). Specifically, a performance testing platform may be used to simulate a browser loading the requesting entity's web page from multiple geographic locations, including any particular locations designated by the requesting entity. From each location, a load with and without acceleration is simulated. For example, a load through the CDN may be performed and also a load that bypasses the CDN and goes directly to the origin of the content may be performed. Alternatively, if the requesting entity has a configured acceleration protocol, the test loads with and without acceleration (Step 1304) may not utilize a performance testing or simulation platform and, instead, simply use the requesting entity's current acceleration protocol and bypass the current acceleration protocol. Notably, if seeking to simulate to different acceleration protocols, when bypassing the current acceleration protocol, a simulated acceleration protocol may be used, for example, using a performance testing platform.

With the test performed, a report is generated and communicated to the requesting entity (Step 1306) to indicate the performance differences between the tested configurations or simulations. The report may be formatted in a graphically-aware way, highlighting the performance gain of accelerated content delivery. The performance gain may be renamed, such as to state, "Your site is X % faster as a result of the CDN."

Figure 14:
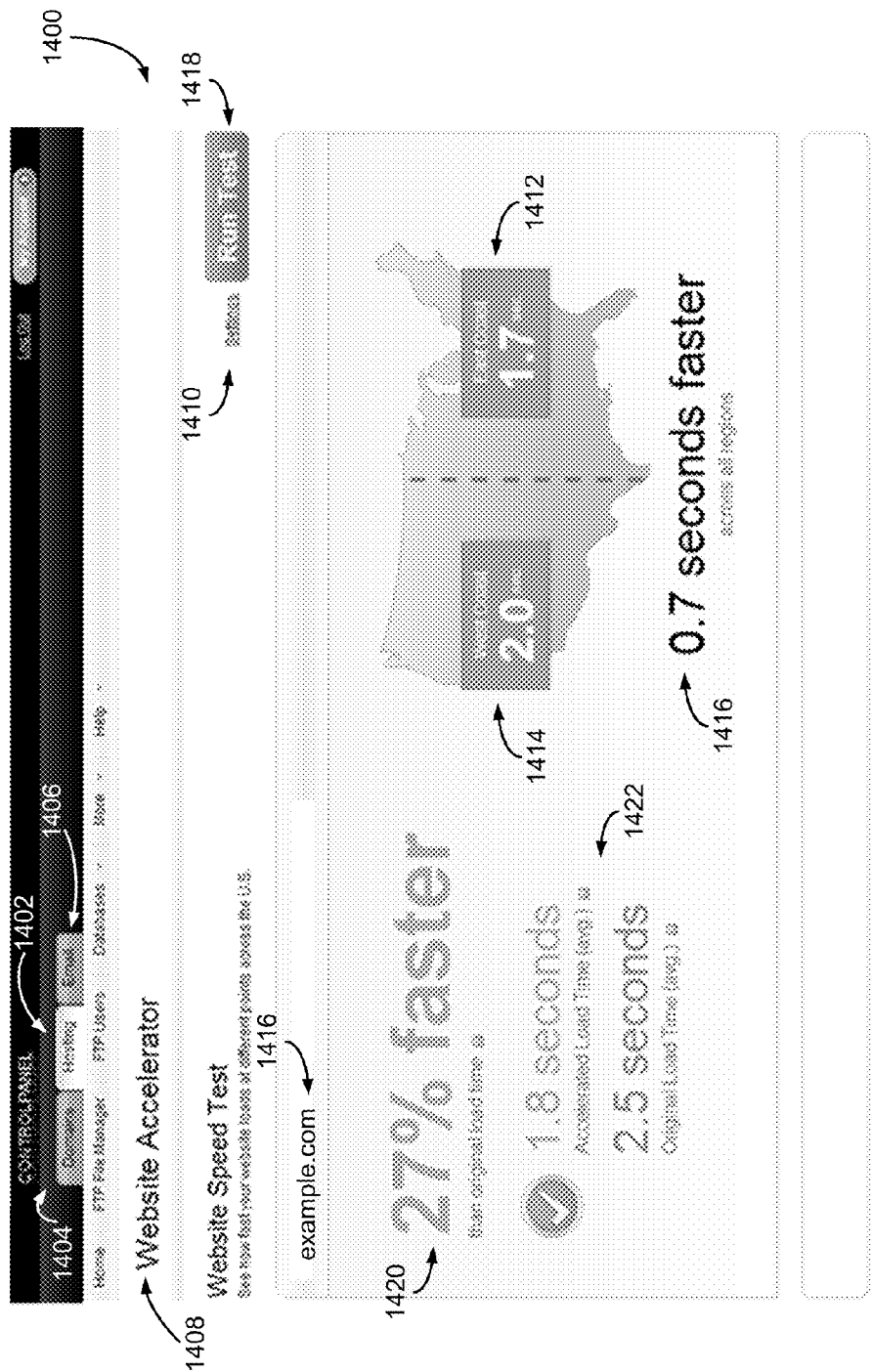
FIG. 14 illustrates one possible embodiment of an interface system for communication with customers.

For example, FIG. 14 provides a non-limiting example of a report 1400 that may be provided to the requesting entity. As described, the report 1400 may be delivered by any of a variety of entities. In the illustrated non-limiting example, the ability to test or simulate accelerated content delivery is provided by an entity providing website or other content hosting or hosting management services through a hosting manager interface 1402. As illustrated, these services may be coupled with or complementary to, or otherwise provided by entities that likewise provide, domain registration or management services 1404 and/or email services 1406.

The report 1400 may be accessed, as a non-limiting example, using a management dashboard, through which performance reports regarding a website accelerator service 1408 can be reviewed. As described above with respect to FIGS. 13A and 13B, various settings and configurations may be communicated, for example, using a settings interface 1410. As a non-limiting example, the requesting entity may designate geographic locations. In the illustrated example report 1400, the requesting entity has selected to designate geographic locations relative to an "East Coast" 1412 and "West Coast" 1414. Of course, any geographic locations, both national and international, can be selected. Other options or settings may include the designated domain, which in the illustrated non-limiting example report 1400 is "example.com" 1416. With these and/or other settings complete, a "Run Test" button 1418 can be used by the requesting entity to communicate the requested test.

As illustrated in the non-limiting example report 1400, the report 1400 communicated following the test may indicate a clear speed increase provided by accelerated content delivery 1420. As described above, the specific speed increase may be communicated in a clear message, for example that a 27 percent faster speed "than original load time" was achieved. Additionally or alternatively, more-specific information may be provided in the report 1400. As a non-limiting example, the report 1400 includes a time comparison 1422. In this non-limiting example case, indicating that the "accelerated load time" was 1.8 second compared with 2.5 seconds for the "original load time." Further still, the report 1400 may include information comparing accelerations associated with the specific geographic locations selected 1412, 1414. In this case, the acceleration achieved at the East Coast 1412 and West Coast 1414 are illustrated in a comparative fashion. Additionally or alternatively, the report 1400 may provide a time gain 1416. Thus, the foregoing provides systems and methods that can be used to measure the speed of a website or other mechanism for content delivery and communicate that measure relative to a baseline.

Configuring a Server for a Customized CDN Service

A CDN may be used by many different users, including, as non-limiting examples, web masters, website developers and/or website administrators. These users may desire to customize their CDN experience. To accomplish this, the CDN users may be enabled to configure the CDN to improve CDN server efficiencies. As non-limiting examples, a website administrator making frequent changes to their website 103 may not want the CDN to cache anything while they are working on their website 103, or while it is otherwise "under construction." Similarly, a website administrator that desires to cache "fresh" files from the origin server 100 in each of the edge servers 104, 107, or notices that a cache 300 is slowing down the resources for the website 103, may desire to clear the cache 300 for all edge servers 104, 107 to improve server efficiencies within the CDN. More detailed explanations for both of these CDN services are provided herein.

The CDN may receive a request from a user to configure each CDN server 100, 111, 104, 107 for such CDN services. Presently existing systems and methods for configuring the CDN for such services require the request to be "pushed" to each CDN server 100, 111, 104, 107 in the network 101. Each server is then configured to perform the requested CDN services. A problem with this "push" approach is that the time required for transmission, configuration and execution of the request may vary between each of the servers. This introduces the possibility and danger of "drift:" a breakdown of the integrity and reliability of the information and/or requests being tracked within a configuration file on each of the CDN servers 100, 111, 104, 107. Such a "push" approach requires each server to track the progress of each of the number of "worker" software modules currently running on the servers to determine if the servers have been properly configured and have executed the request for the CDN service(s).

The complications introduced by a push model only compound as multiple websites 103 are hosted and/or cached on multiple servers, and multiple users are configuring and accessing the multiple websites 103. Monitoring the progress of, and tracking the configuration and executed requests for, each of the users of each of the websites 103 on each of the servers for each of the CDN services becomes exponentially difficult.

Applicant has therefore determined that a "pull" approach, as described herein, represents a more efficient approach for transmitting, configuring servers for, and executing such requests. An important advantage to a pull approach is that the system doesn't need to monitor the progress of, and/or track the configuration and executed requests for, each of the users of each of the websites 103 on each of the CDN servers 100, 111, 104, 107 for each of the CDN services. All of the CDN servers 100, 111, 104, 107 are assured to retrieve, at a regular interval, a list of affected websites 103 and the operating mode that they are currently configured for, such as having a cleared cache or operating with developer mode on or off, thereby creating a more efficient and less messy solution. This approach eliminates the possibility of drift seen in the push approach because each CDN server 100, 111, 104, 107 maintains the integrity of the retrieved list. Any server that misses an update is returned to synchronization with all other CDN servers 100, 111, 104, 107 during the next rotation at the regular interval.

Figure 15:
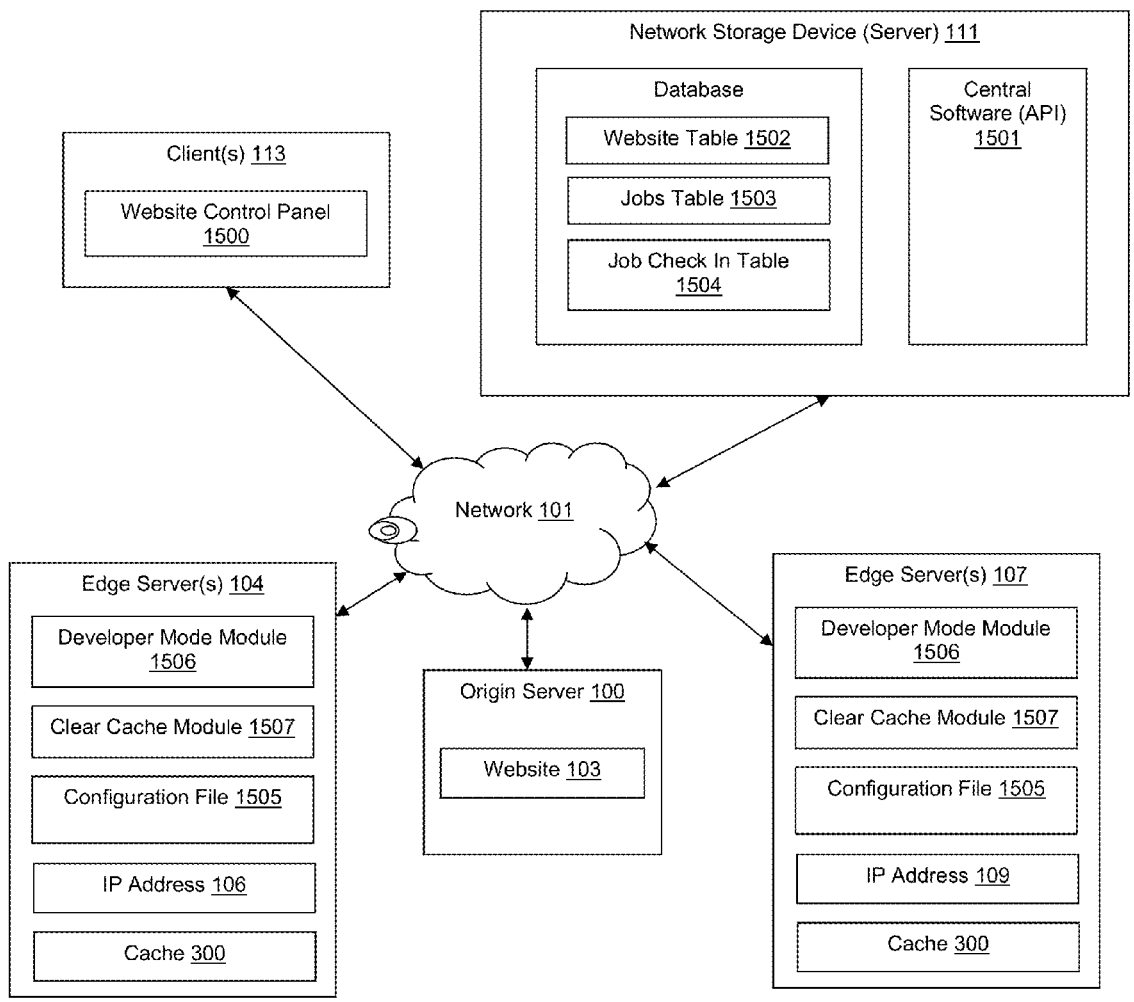
FIG. 15 illustrates a possible embodiment of a system for customizing a CDN using CDN services.

Many systems may be used to configure a CDN system via a "pull" approach. FIG. 15 represents a non-limiting example embodiment of such a system. A user may use a website control panel 1500 to make a request for a CDN service such as clearing a website cache 300 on all CDN servers 100, 111, 104, 107 or developing a website 103 in developer mode.

This website control panel 1500 may be any control panel known in the art used to administer general website 103 administration functions. Such a control panel 1500 may be displayed and run on a client computer 113 communicatively coupled to a network 101. In some embodiments, the website control panel 1500 may be developed, downloaded and/or run on the client computer 113. In other embodiments, the website control panel 1500 may be rendered on a server computer and accessed by, transmitted to and displayed on, the client computer 113.

The website control panel 1500 may be configured to identify the website 103 that it controls, possibly using the website's 103 domain name, IP address, unique URL, server on which the website 103 is hosted, etc., and may authenticate a user as a web master, website developer and/or website administrator of the website 103 using any method of authentication known in the art. The website control panel 1500 may comprise a form comprising user interface components which, in addition to any general website 103 administration functions, may receive one or more requests for CDN services, such as clearing a cache 300 or turning a developer mode on or off for the website 103. As a non-limiting example, a webmaster for a website "website.com," hosted on a server located at IP address 12.345.567, may log into the website control panel 1500 by providing a username "webmaster" and a password "password." The webmaster may then request that certain administrative functions, possibly including CDN configurations, be executed for website.com.

The website control panel 1500 may be configured to connect to and maintain a connection with one or more software modules (central software 1501) running on any CDN server 100, 111, 104, 107. This connection may be made through the network 101 using any method of network connection disclosed herein or known in the art, and may be used to transmit, to the central software 1501, the identification of the website 103 and/or user, a request for any CDN services or any other website administration functions, and/or identification of the type of request received (e.g. "devmode," "devmodeon," "devmodeoff," "clearcache," etc.). As non-limiting examples, this information may be transmitted via query strings, hidden fields, metadata, or any other means of network data transmission known in the art.

The central software 1501 may then receive the request and the data transmitted from the website control panel 1501. The central software 1501 may be used to accomplish any method steps disclosed herein and performed by any of the CDN servers 100, 111, 104, 107 on which the central software 1501 is running. In some embodiments, the central software 1501 may comprise an Application Programming Interface (API) 1501 capable of connecting to any type of software within the CDN, and any request to the API 1501 disclosed herein may comprise a Remote Procedure Call (RPC) to the API 1501. An API 1501 may comprise a service made available to third parties, which may further comprise any individual, entity, system, hardware, or software wishing to access the disclosed information and functionality. Such an API 1501 may comprise a software-to-software interface that specifies the protocol defining how independent computer programs interact or communicate with each other. It also may comprise a collection of pre-configured building blocks allowing a third party to easily configure their software for compatibility and/or extensibility.

The API 1501 may comprise any API type known in the art or developed in the future including, but not limited to, request-style, Berkeley Sockets, Transport Layer Interface (TLI), Representational State Transfer (REST), Simple Object Access Protocol (SOAP), RPCs, Standard Query Language (SQL), file transfer, message delivery, and/or any combination thereof. The API 1501 may comprise computer-readable code that, when executed, causes the API 1501 to receive an RPC (i.e., function call) requesting information services. Responsive to receipt of the RPC, the API 1501 may perform the above described processes, and transmit a request results to the requesting third party.

To submit the request via an RPC to the API 1501, the server(s) may require authentication with the API 1501. Computers or servers may locate the API 1501 via an access protected URL mapped to the API 1501, and may then use an API key configured to authenticate the one or more computers or servers prior to accessing the API 1501.

The central software 1501 may respond to the received request from the website control panel 1500 by analyzing the received request and additional transmitted data to identify the associated website 103 and type of request received. The central software 1501 may then temporarily store the request type (e.g., "devmode," "clearcache") received from the website control panel 1500. In the interest of simplicity, the following description and explanations will include only the domain name for a website. This should not limit the scope of the invention, however. The associated website 103 may be identified by any relevant website information including the website's domain name, IP address, unique URL, server on which the website 103 is hosted, etc. Thus, "domain name" should be understood to include any information used to identify a website 103.

The domain name of the identified website 103 may be used to generate and execute a database query for a website data record, which contains the domain name, within a website table 1502 in the database. The website table 1502 may comprise one or more website data records, each website data record comprising a data field/column for a unique website identifier (site_id), possibly generated by the database and/or the central software 1501 as a sequential number. Each website data record may also comprise a data field/column for a domain name for the identified website 103 (domain). As a non-limiting example, the query may comprise the following SQL query: SELECT site_id FROM websites WHERE domain='website.com'. The query may be executed and a query result returned to the central software 1501.

The central software 1501 may determine if the query result comprises at least one website data record. If so, the central software 1501 may analyze the website data record(s) to identify the data stored in the site_id data field/column and temporarily store this site_id data. However, if the query result does not comprise a website data record, the central software 1501 may be configured to generate and execute a database query to create a website data record in the website table 1502 for the website information received with the request from the website control panel 1500. The website data record may comprise a unique website data record identifier for the record and the domain name of the website 103 identified in the request.

After generating and executing the database query to create the website data record, the central software 1501 may query that website data record and temporarily store the data stored in the site_id data field/column as it would have with the returned website data record. The central software 1501 may then be configured to generate and execute a query to create and insert a job data record into a jobs table 1503 in the database. This jobs table 1503 may comprise one or more job data records, each comprising data fields/columns for: a unique job data record identifier (job_id); a unique website data record identifier (site_id—possibly as a foreign key, joining the unique website record identifier to a record in the website table 1502); a job type (type—identified by the request type received from the website control panel 1500, such as "devmode," "devmodeon," "devmodeoff," "clearcache," etc.); and a time and/or date that the centralized software 1501 received the request and/or that the job data record was created (create_date).

To write the job data record to the database, the centralized software 1501 may be configured to: generate, or receive, as generated by the database, and store a job_id (e.g., a sequential number for each website record); insert, into the job record table's 1503 site_id data field/column, or join, possibly as a foreign key, the temporarily stored site_id; insert the temporarily stored request type received from the website control panel 1500 into the type data field/column; and insert a time/date stamp into the create_date data field/column. As a non-limiting example, the query for a new job record 321 referencing website_id 123 may include the following SQL query: INSERT INTO jobs ([job_id,] site_id, type, create_date) VALUES ([321,] 123, 'devmodeon', 'Jan. 1, 2013 12:00').

One or more software modules 1506, 1507 may be written, installed and run on one or more CDN servers 100, 111, 104, 107. In some embodiments, the one or more software modules 1506 may be configured to request and configure the server for a list of websites to configure for "developer mode." In other embodiments, the one or more software modules 1507 may be configured to clear the cache 300 of the server 104, 107 on which the software modules 1507 are running if this server 107 is not identified in a job check in table 1504, described herein.

To accomplish the method steps disclosed herein, various method functions within these software modules 1506, 1507 may be configured to connect to the central software 1501 and run on each server 104, 107 at a regular interval, such as once every minute, once every 3 minutes, once every 5 minutes, once every 30 minutes, once every 24 hours, etc., depending on the method steps to be executed. The length of the regular interval may be determined by a website 103 administrator according to a balance struck to maximize efficiencies of the CDN. As a non-limiting example, a website 103 administrator may experiment with various lengths of the regular interval within the CDN to determine an ideal regular interval which allows all CDN servers 100, 111, 104, 107 to request modes for each website 103 hosted on that server at a frequent interval without overtaxing the resources of the server.

The website administrator may set the regular interval at which the software modules 1506, 1507 may run these methods. Any method known in the art causing a computer to execute a repeated command at a regular interval may be used. As a non-limiting example, the regular interval may be set via the website control panel 1500 and/or via a "cron" job on the CDN server(s) 100, 111, 104, 107. When run, these methods may execute a repeated command within the software modules 1506, 1507 to request from the central software 1501, at the regular interval, a list of domain names pulled from information within the jobs table 1503 representing websites 103 that are hosted on the server that hosts the software modules 1506, 1507. For each domain name in the list, a current operating mode for the website may be included, indicating that the website should be updated to reflect this operating mode. As non-limiting examples, the list may include a pairing of "website.com" with "devmode," indicating that website.com should be updated on all CDN servers 100, 111, 104, 107 that requested the list, and that host website.com, to create a "pass-through" on all HTTP requests to that server, so that the requests are routed to an origin server 100 within the CDN. Likewise, the list may include a pairing of "website.com" with "clearcache," indicating that website.com should be updated on all CDN servers 100, 111, 104, 107 that requested the list, and that host website.com, to clear the cache for website.com if the request is not found in a job check in table 1504, described herein.

The central software 1501 may, at regular intervals, receive the request from the software modules 1506, 1507 for the list of domain names and their current operating mode. In response to this request, the central software 1501 may generate and execute a database query for current job data records within the jobs table 1502. In some example embodiments, a request from a developer mode module 1506 may designate that the request is for job data records identified as "devmode," "devmodeon" or "devmodeoff," depending on the embodiment. Likewise, in some example embodiments, a request from a clear cache module 1507 may designate that the request is for job data records identified as "clearcache." Thus, as non-limiting examples, the generated and executed SQL query may be "SELECT * FROM jobs", "SELECT * FROM jobs WHERE type='devmode'", or "SELECT * FROM jobs WHERE type='clearcache'", etc., depending on the embodiment.

In response to the generated and executed database query, the database may return a query result comprising one or more job data records. The central software 1501 may then identify, within each of the returned job data records, the data within the site_id and type fields/columns, according to the embodiment. For each of these job records, the central software 1501 may, if needed, determine the domain name for the website via database query, as previously described, and generate an entry in the data list, comprising at least the affected website 103, possibly identified by domain name, and indicating the current operating mode for the website 103. The list may then be transmitted to each CDN server 100, 111, 104, 107 that requested the list.

One or more software modules (not shown), either integrated into the central software 1501 or running separately from the central software 1501, may be configured to ensure that only the most recent job data records are selected from the jobs table 1503 and added to the data list sent to the requesting CDN server 100, 111, 104, 107. This software may be run at a regular interval (e.g., nightly at midnight, each 24 hours, etc.). When run, this software may be configured to: identify a current time (e.g., via a "now( )" function); generate, execute, and receive a query response for a database query selecting each job data record in the jobs table 1503; identify the time and/or date in the create_date data field/column of each record returned in the query response; and compare the identified current time with the identified time/date in each job record. For each identified time/date that is older than the last regular interval, the associated job data record in the database may be updated to reflect that the record is "stale."

In some embodiments, "stale" records may be deleted from the jobs table 1503, possibly via a database query, to ensure that the jobs table 1503 does not grow unwieldy. Requests from the CDN software 1506, 1507, will clearly not include data from job data records which have been deleted, thereby ensuring that only the most recent job data records are selected from the jobs table 1503. In other embodiments, the jobs table may include an additional data field/column indicating a record is "expired," and therefore stale, or "not expired." In these embodiments, the central software 1501 may be configured to only select those records that are not stale to include in the data list to be sent to the CDN servers 100, 111, 104, 107. In these embodiments, the software disclosed above may be configured to delete records marked as expired at the regular interval.

Configuring a Server for Developer Mode for a Website

"Developer mode" may allow a website 103 administrator to develop and/or otherwise make changes to a website 103, the changes being immediately displayed to be reviewed by the website 103 administrator. To accomplish this, any edge server 104, 107 acting as a proxy server within the CDN may be configured to receive one or more HTTP requests and, rather than serving any cached content stored on the edge server 104, 107 for the website 103, create a "pass through" on the HTTP requests so that the requests are routed directly to the origin server 100, thereby allowing the origin server 100 to serve dynamic and non-cached static content for the website 103.

The website control panel 1500 may receive a request from the user to activate or deactivate developer mode. As a non-limiting example, the website control panel 1500 may comprise a "radio button" user interface component with selections for "developer mode on" or "developer mode off" for website.com. The website control panel 1500 may then connect with, and transmit the identified website and the request type (e.g., "devmode," "devmodeon" or "devmodeoff") to, the central software 1501.

The central software 1501 may then receive this request and process the received data, identifying the website 103 for which to update the operating mode, and the request type as a request to activate or deactivate developer mode. In some embodiments, the central software may comprise an API 1501 and the request may comprise a RPC. The central software 1501 may run a database query within the website table 1502 to identify the affected website 103, as disclosed herein, and may run another database query to update the jobs table 1503, possibly by writing a new job record, to reflect the developer mode request. If the request from the website control panel 1500 is identified as a request to turn developer mode on, a new record may be created in the jobs table 1503, as disclosed herein, including a unique job data record identifier, the website unique data record identifier for the website 103, a job type as "devmode" or "devmodeon" and a date and/or time the request was received and/or the record was created.

If the request from the website control panel 1500 is identified as a request to turn developer mode off, in some embodiments, the central software 1501 may generate and execute a database query deleting any job data records containing the identified unique website record identifier flagged as having developer mode activated. In some embodiments, where the type data field/column is stored as having developer mode activated (e.g., "devmodeon"), the database 113 query may update the data field to reflect developer mode being deactivated (e.g., "devmodeoff").

One or more developer mode software modules 1506 running on each of the edge servers 104, 107, may send a request at a regular interval for the data list of websites 103 and whether each website 103 is operating in developer mode. The central software 1501 may receive each of these requests, and, for each request may query the jobs table 1503 for jobs data records flagged as having developer mode activated, and may receive the query results for this query. In embodiments where requests for developer mode to be deactivated resulted in job data records being deleted, all job data records flagged as developer mode records may be selected from the jobs table 1503. In embodiments where requests for developer mode to be deactivated resulted in job records being updated to reflect developer mode being deactivated (e.g., "devmodeoff"), the database query may select only those records flagged as having developer mode activated (e.g., "devmodeon").

For each record in the query results, the central software 1501 may identify the domain (possibly via a database query to the website table 1502, as disclosed herein), and may add the domain name to the data list, paired with an operating mode for the website 103 indicating that developer mode is active for this website 103 (e.g., domain="website.com", mode="devmode"). Once the identified website 103 and operating mode pairing has been added as a list entry to the data list for each record returned in the query results, the central software 1501 may then transmit the data list to each requesting developer mode module 1506.

Each requesting developer mode module 1506 may then receive the data list, and for each list entry comprising a website identifier and operating mode pairing in the list, may synchronize the data list from the central software 1501 with another list of websites 103/operating mode pairings within a configuration file 1505 that defines behavior of a related software and/or hardware. As a non-limiting example, the CDN server(s) 100, 111, 104, 107 may be running a web server such as Apache Traffic Server, and the configuration file 1505 may be a text and/or XML file which defines the behavior of this web server or server computer 104, 107, such as determining which websites 103 running on the CDN server(s) 100, 111, 104, 107 are currently running in developer mode and creating the previously-described pass through to the origin server 100 for these websites 103.

For each entry in the central software 1501 generated list, the developer mode module(s) 1506 may analyze the entry and determine if this entry is found within the configuration file 1505 list. If so, the two lists may be identified as synchronized and no action need be taken, since the central software 1501 generated list indicates that the website 103 should remain in developer mode. If the list entry from the central software 1501 generated list is not in the configuration file 1505 list, the entry may be added to the configuration file 1505 list to bring the two lists into synchronization. The developer mode module(s) 1506 may then identify, within the configuration file 1505 list, any entries that are not in the central software 1501 generated list and remove them from the configuration file 1505 list.

Once the two files are synchronized on each of the edge servers 104, 107, the developer mode module 1506 may then execute instructions to the edge server 104, 107, on which it is running, to re-read the configuration file 1505, thereby applying the changes and updating the operating mode for each website 103 hosted on that server. The edge serve(s) 104, 107 will then ignore all instructions to cache content for websites 103 running in developer mode, and will pass all HTTP requests through to the origin server 100

Figure 16:
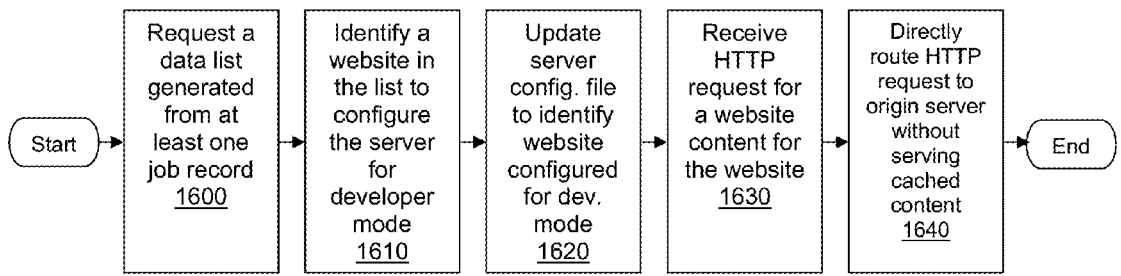
FIG. 16 is a flow diagram illustrating a possible embodiment of a method for developing a website using a developer mode.

FIG. 16 shows an embodiment of a method for configuring an origin server 100 website content delivery using a server computer 104, 107. This the method may comprise the steps of a server computer 104, 107 communicating, over a communications network 101 and from the server computer 104, 107, a request for a data list generated from at least one job record (Step 1600); analyzing the data list received over the communications network 101 to identify a website 103 for which to configure the server computer 104, 107 for a developer mode (Step 1610); updating a server configuration file 1505 for the server computer 104, 107 to identify at least one website 103 in the data list configured for the developer mode (Step 1620); receiving at least one HTTP request for a website content for the at least one website 103 (Step 1630); and in response to the at least one HTTP request and for each of the at least one website 103 identified in the server configuration file 1505 as configured for the developer mode, directly routing, from the server computer 104, 107, the at least one HTTP request for the website 103 content to an origin server 100 without caching the website 103 content on, or serving the website 103 content from, a cache 300 within the server computer 104, 107 (Step 1640).

Figure 17:
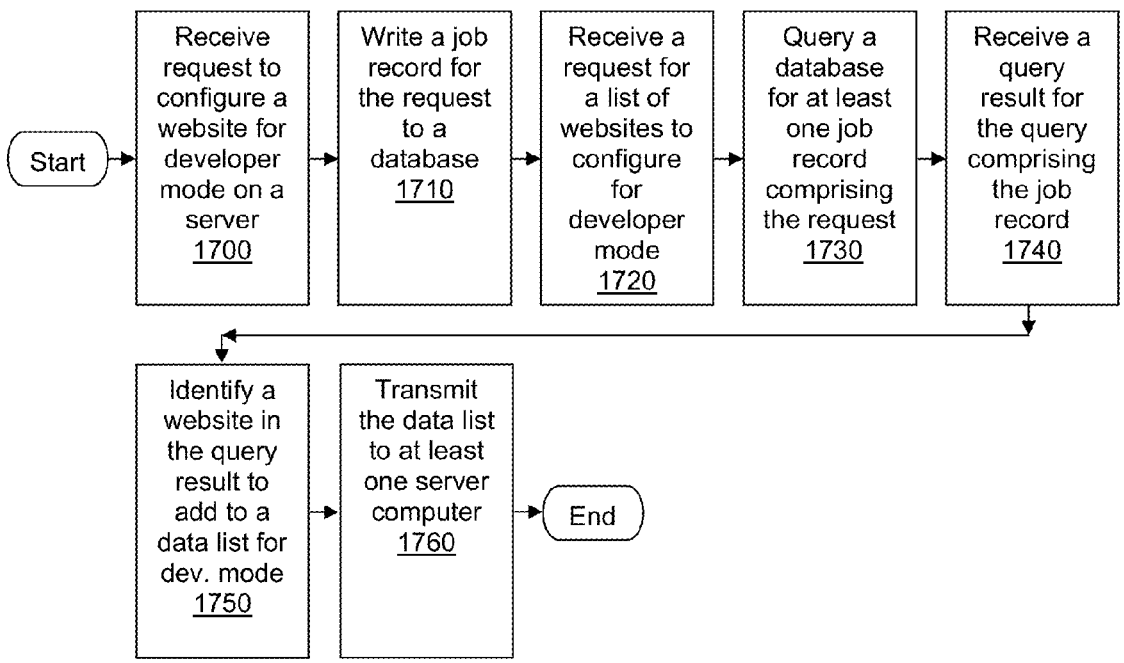
FIG. 17 is a flow diagram illustrating a possible embodiment of a method for developing a website using a developer mode.

FIG. 17 shows an embodiment of a method for generating a data list of websites 103 to configure for an origin server 100 website 103 content delivery using a server computer 111. This method may comprise the steps of a server computer 111 communicating, over a communications network 101, a request to configure a website 103 for a developer mode on at least one server computer 104, 107 coupled to the communications network 101 (Step 1700); writing to a database coupled to the communications network 101, a job record for the request (Step 1710); receiving a request by the at least one server computer 111 for the data list of websites 103 to configure for the developer mode (Step 1720); querying the database for at least one job record comprising the job record for the request (Step 1730); receiving a query result comprising the at least one job record (Step 1740); analyzing the query result to identify at least one website 103 in the query result to add to the data list of websites 103 to configure for the developer mode, the developer mode directly routing, from each of the at least one server computer 104, 107, at least one HTTP request for a website 103 content for each of the at least one website in the data list to an origin server 100 without caching the website 103 content on, or serving the website 103 content from, a cache 300 within the at least one server computer 104, 107 (Step 1750); and transmitting, from the server computer 111, the data list to the at least one server computer 104, 107 (Step 1760).

Configuring a Server for Clearing a Website Content Cache

A clear cache 300 operating mode for a website 103 may comprise a one-time operation that instructs all of the CDN servers 100, 111, 104, 107 to drop their files from cache 300 for the given website 103. This operation, received as a request from the website control panel 1500, may remove cached website 103 content from one or more non-origin servers (e.g., "edge" servers 104, 107) acting as proxy web servers within the CDN. This, in turn, may force the edge servers 104, 107 to re-route all HTTP requests to the origin server 100, which may then serve "fresh" website 103 files and data (possibly including dynamic content), until the most recent version of the content, possibly comprising files or data, is again stored within the cache 300 of each of the non-origin servers within the CDN.

The website control panel 1500 may receive a request from a user to clear the cache 300 on all non-origin servers 104, 107 in the CDN. As a non-limiting example, the website control panel 1500 may comprise a checkbox user interface component allowing the user to select to clear the cache 300 for website.com. The website control panel 1500 may then connect with and transmit to the central software 1501 the identified website 103 and the request type as "clearcache." as a non-limiting example. In some embodiments, once a user has transmitted a clear cache 300 request, it may not be undone, so that the clear cache 300 will be performed once requested.

In some embodiments, the website control panel 1500 may consume data from the central software 1501 to determine whether the website 103 controlled by the website control panel 1500 is eligible for clearing its cache 300. As a non-limiting example, software logic may exist in which the cache 300 for the website 103 may only be cleared every 24 hours. The central software 1501 (possibly in conjunction with the database) may contain this logic and/or data indicating that the cache 300 for the identified website 103 has been cleared within the past 24 hours. The website control panel 1501 may consume this information, and may display an alert to the user that the website 103 may not currently be cleared, since 24 hours has not passed since the last clear cache 300 request by the user for this website 103.

The central software 1501 may receive the clear cache 300 request from the website control panel 1500 and process the received data, identifying the website 103 for which to clear the cache 300, and the request type as a request for clearing the cache 300 for the website 103 throughout the CDN. In some embodiments, the central software may comprise an API 1501 and the request may comprise a RPC. The central software 1501 may run a database query within the website table 1502 to identify the affected website 103, as disclosed herein, and may run another database query to update the jobs table 1503, possibly by writing a new job record, to reflect the clear cache 300 request.

A clear cache module 1507 running on each of the edge servers 104, 107, may send a request at a regular interval for a list of websites 103 for which to clear a cache 300 on each of the non-origin CDN servers 104, 107. In addition, each clear cache module 1507 may identify an IP address 106, 109 for the server 104, 107 on which it is running and transmit that IP address 106, 109, in conjunction with the request for the list, to the central software 1501. The central software 1501 may receive these requests, and, for each request, identify and temporarily store the IP address 106, 109 for the server which requested it.

The central software 1501 may then query the jobs table 1503 for job records flagged with a type indicating clear cache 300, and may receive the query results from this query comprising one or more job records. For each record in the query results, the central software 1501 may identify, within each of the returned job records, the data from the job_id and the site_id data fields/columns, and temporarily store this data for subsequent database queries.

The central software 1501 may, for the job_id data identified in each returned job data record, query a job check in table 1504 for one or more job check in data records that contain that job_id. The job check in table 1504 may comprise one or more job check in records, each comprising data fields/columns for: a unique job check in data record identifier (checkin_id); a unique job data record identifier (job_id—possibly as a foreign key, joining the unique job data record identifier to a record in the jobs table 1503); an IP address of a CDN server that has cleared its cache for the website 103 identified in the job data record associated with the job_id (ip); and a time and/or date that the request to clear cache was received by the central software 1501, and/or that the job record was created (create_date). As a non-limiting example, a SQL query for the one or more job check in data records may be: "SELECT job_id, ip FROM jobcheckin WHERE job_id='[the temporarily stored job_id]' and ip='[the temporarily stored IP address]'." The query may be run, and a query result may be returned, possibly comprising one or more job check in data records.

The central software 1501 may then determine if any records were returned in the query result. If so, it may be determined that the cache for the website has already been cleared on the CDN server 104, 107 found at that IP address 106, 109, and no further action for the job record is necessary by the central software 1501, which may then repeat the process for the next job record returned. However, if no job check in records were returned in the query result, this may indicate that the cache 300 still needs to be cleared for the identified website 103 on the CDN server 104, 107 found at the identified IP address 106, 109.

To accomplish this, the central software 1501 may identify, using the temporarily stored site_id for the job data record, the domain (possibly via a database query to the website table 1502, as disclosed herein), and may add the domain name to a data list generated by the central software 1501 comprising websites 103 for which to clear a cache 300. In addition to the domain name for each website, each entry in the data list may also include the job_id associated with the clear cache 300 job data record in the jobs table 1503 and the IP address 106, 109 of the CDN server 104, 107 that requested the data list. Once the job_id data, the identified website and the IP address 106, 109 have been added as list entries to the data list for each of the job data records returned in the query result which were not returned in the query result from the job check in data records for each of the job records, the central software 1501 may then transmit the list to each requesting clear cache module 1507 on each requesting CDN server 104, 107 at its respective IP address 106, 109.

Each clear cache software module 1507 may receive the data list of websites 103 for which to clear the cache 300, and in response, may determine the IP address 106, 109 of the server 104, 107 on which the clear cache module 1507 is running. Each clear cache module 1507 may then analyze the data list to determine if its self-identified IP address 106, 109 is found as an IP address 106, 109 in the data list. If not, the clear cache software module 1507 may determine that the cache 300 for the requested website 103 has already been cleared and no further action is necessary.

However, if the clear cache module 1507 determines that the IP address 106, 109 for the server 104, 107 on which it is running is found within the data list, it may determine that the cache 300 for a website 103 on the server 104, 107 needs to be cleared. Accordingly, the clear cache software module 1507 may identify the website 103 within the data list for which to clear the content from the cache 300. The clear cache module 1507 may also identify, and temporarily store the job_id from, and associated with the IP address 104, 107 and the website 103 in a data entry in, the data list.

The clear cache software module 1507 may then be configured to clear the cache 300 for the identified website 103 and send instructions and/or a request to the central software 1501 (possibly in the form of an RPC) to write a job check in data record to the job check in table 1504. This request may include identifying information for the temporarily stored job_id and the self-identified IP address 106, 109 of the server 104, 107 running the clear cache module(s) 1507.

The central software 1501 may receive the request to write a job check in data record to the job check in table 1504, along with the job_id and the IP address 106, 109 of the server 104,

107 that cleared its cache 300, and may write the job check in data record to the job check in table 1504 comprising a unique job check in identifier (checkin_id—possibly an incremental number generated by the database or the central software 1501), the received job_id for the clear cache job and the IP address 106, 109 of the server 104, 107 that cleared the cache 300 for the website 103.

The integrated or independently running software described above (not shown) may delete "stale" job records at the regular interval using the methods described above. In some embodiments, when "stale" job records are deleted, the central software 1501 may be configured to also delete any job check in records containing the foreign job_id field of the stale job records which were deleted, possibly accomplished via a cascading delete functionality built into the database.

Figure 18:
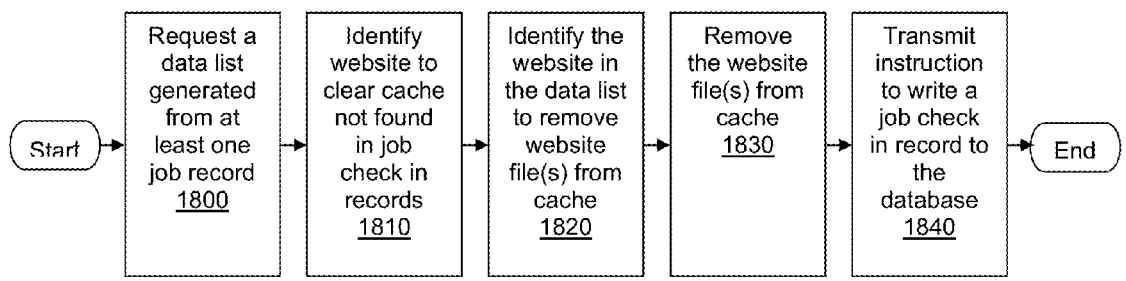
FIG. 18 is a flow diagram illustrating a possible embodiment of a method for clearing a cache.

FIG. 18 shows an embodiment of a method for configuring a server computer 104, 107 to clear a cache 300 for a website 103. This method may comprise the steps of a server computer 104, 107 communicating, over a communications network 101, a request for a data list generated from at least one job record (Step 1800). Each job record may identify a website 103 for which to remove at least one website file stored in a cache 300 on the server computer 104, 107 and may not be associated, in a database coupled to the communications network 101, with at least one job check in record in the database, the job check in record indicating that the at least one website file has previously been removed from the cache 300 during a time interval (Step 1810). The method may further comprise the steps of the server computer 104, 107 analyzing the data list received over the communications network 101 to identify the website 103 for which to remove the at least one website file from the cache 300 (Step 1820). Based on the previous step, the server computer 104, 107 may remove the at least one website file from the cache 300 (Step 1830) and transmit, to a central software running on another server computer 111, at least one instruction, to be executed by the other server computer 111, to write the at least one job check in record, associated with the at least one job record, to the database (Step 1840).

Figure 19:
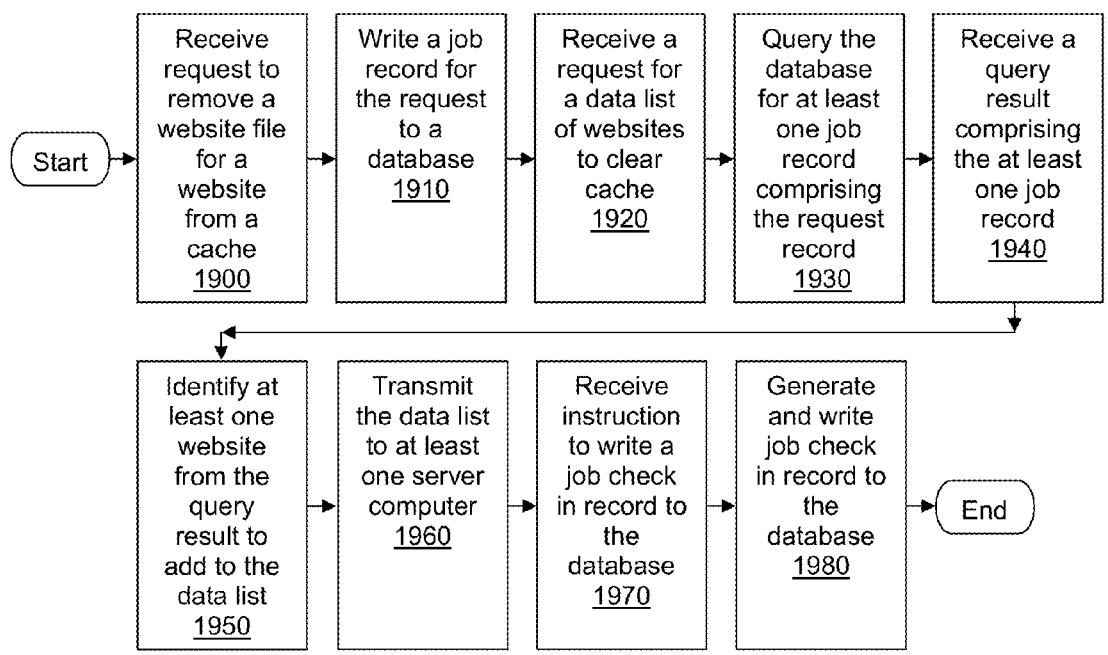
FIG. 19 is a flow diagram illustrating a possible embodiment of a method for clearing a cache.

FIG. 19 shows an embodiment of a method for generating a data list of websites 103 for which to clear a cache 300 on at least one server computer 104, 107 coupled to a communications network 101. This method may comprise the steps of a server computer 111 communicating, over the communications network 101, a request to remove from the cache 300 at least one website file for a website 103 (Step 1900); writing to a database coupled to the communications network 101, a job record for the request (Step 1910); receiving a request by the at least one server computer 104, 107 for the data list of websites 103 (Step 1920); querying the database for at least one job record comprising the job record for the request (Step 1930). Each record may identify a website 103 for which to remove at least one website file stored in a cache 300 within the server computer 104, 107; and may not be associated, in the database, with at least one job check in record, the at least one job check in record indicating that the at least one website file has previously been removed from the cache 300 during a time interval. The method may further comprise the steps of the server computer 111 receiving, at the server computer 111, a query result comprising the at least one job record (Step 1940); analyzing the query result to identify at least one website 103 in the query result to add to the data list of websites 103 for which to remove the at least one website file from the cache 300 (Step 1950); transmitting the data list to the at least one server computer 104, 107 (Step 1960); receiving at least one instruction from the at least one server computer 104, 107 to write, to the database, the at least one job check in record for the job record (Step 1970); and generating and writing the at least one job check record to the database (Step 1980).

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method for configuring a server computer to clear a cache for a website, the method comprising the steps of:
    communicating at a regular interval, over a communications network from the server computer acting as an edge server and a cache proxy in a content delivery network (CDN), a request, including a self-identifying Internet Protocol (IP) address, for a data list identifying at least one website for which to remove at least one website file stored in the cache on the server computer, and generated from a database query, run since the last regular interval, and returning at least one job record comprising a job record identification data, a website identification data and a clear cache job type data, each of the at least one job record;
    not being associated, in a database coupled to the communications network, with at least one job check in record in the database, the at least one job check in record comprising the job record identification data and the self-identifying IP address and indicating that the at least one website file has previously been removed from the cache during a time interval;
    analyzing, using the server computer, the data list received over the communications network to identify the website for which to remove the at least one website file from the cache;
    based on the analyzing step, removing, using the server computer, the at least one website file from the cache; and
    transmitting, from the server computer, to a central software running on an other server computer, at least one instruction, to be executed by the other server computer, to write the at least one job check in record, comprising the job record identification data and the self-identifying IP address to the database.

2. The method of claim 1, further comprising the steps of:
    identifying, using the server computer, the address for the server computer;
    transmitting, from the server computer, at the regular interval:
        the request for the data list; and
        the IP address identifying the server computer that requested the list;
    receiving, at the server computer, the data list comprising at least one list entry, each of the at least one list entry comprising:
        a job record identifier;
        a website identifier identifying the website for which to remove the at least one website file; and at least one IP address of at least one server for which to remove the at least one website file for the website.

3. The method of claim 2, wherein:
the analyzing step further comprises the steps of:
identifying, using the server computer, the IP address for the server computer; and
determining, using the server computer, whether the at least one IP address identified in the data list comprises the IP address for the server computer;
the removing step further comprises the steps of, in response to a determination that the at least one IP address identified in the data list comprises the IP address for the server computer:
temporarily storing, on the server computer, the job record identifier identified in the data list; and
removing, from the cache of the server computer, the at least one website file for the website identified by the website identifier; and
the at least one instruction to write the at least one job check in record further comprises:
the job record identifier identified in the data list; and
the IP address identified for the server computer.

4. A method for generating, using a server computer, a data list of websites for which to clear a cache on at least one server computer coupled to a communications network, the method comprising the steps of:
communicating, over the communications network, from a control panel on a client computer to the server computer, a request to remove from the cache at least one website file for a website;
writing, using the server computer, to a database coupled to the communications network, a job record for the request, the job record comprising a job record identification data, a website identification data and a clear cache job type data;
receiving, at the server computer at a regular interval, a request by the at least one server computer, acting as an edge server and a cache proxy in a content delivery network and including a self-identifying IP address, for the data list of websites identifying at least one website for which to remove at least one website file stored in the cache on the at least one server computer;
querying, using the server computer, the database for at least one job record generated since the last regular interval and comprising the job record, each of the at least one job record:
not being associated, in the database, with at least one job check in record, the at least one job check in record comprising the job record identification data and the self-identifying IP address and indicating that the at least one website file has previously been removed from the cache during a time interval;
receiving, at the server computer, a query result comprising the at least one job record;
analyzing, using the server computer, the query result to identify at least one website in the query result to add to the data list of websites for which to remove the at least one website file from the cache;
transmitting, from the server computer, the data list to the self-identifying IP address for each of the at least one server computer;
receiving, at the server computer, at least one instruction from the at least one server computer to write, to the database, the at least one job check in record for the job record; and generating and writing, using the server computer, the at least one job check record, comprising the job record identification data and the self-identifying IP address, to the database.

5. The method of claim 4, wherein the request to remove the at least one website file from the cache is received through the communications network from a website control panel running on a client computer coupled to the communications network, the website control panel being configured to:
identify the website controlled by the website control panel;
receive, from a user, a request to remove the at least one website file from the cache;
connect to the server computer through the communications network; and
transmit to the server computer:
a website identifier for the website; and
a request type for the request, the request type identified as a request to remove the at least one website file from the cache.

6. The method of claim 5, further comprising the steps of:
receiving, at the server computer, the request from the website control panel to remove the at least one website file from the cache;
analyzing, using the server computer, the request to identify, within the request:
the website identifier for the website; and
the request type for the request;
temporarily storing, using the server computer, the request type.

7. The method of claim 4, wherein the database comprises:
a website data table comprising at least one website record, each of the at least one website record comprising:
a unique website identifier data field; and
a domain name data field comprising a domain name of the website;
a jobs data table comprising at least one job record, each of the at least one job record comprising:
a unique job identifier data field;
a website identifier data field joined to the unique website identifier data field;
a job type data field; and
a job record creation date and time data field; and
a job check in data table comprising at least one job check in record, each of the at least one job check in record comprising:
a unique job check in identifier data field;
a job identifier data field joined to the unique job identifier data field;
an IP address data field; and
a job check in record creation date and time data field.

8. The method of claim 6, further comprising the steps of:
querying, using the server computer, the database for a website record comprising the website identifier for the website;
receiving, at the server computer, from the database, a query result;
determining, using the server computer, whether the query result comprises at least one data record;
in response to a determination that the query result comprises the at least one data record, identifying, using the server computer, within the at least one data record, a unique website identifier; and
in response to a determination that the query result does not comprise the at least one data record:
generating and writing, using the server computer, a website record to the database; and identifying, using the server computer, within the website record, the unique website identifier.

9. The method of claim 8, wherein the job record written to the database comprises:
the unique website identifier;
the request type temporarily stored by the server computer; and
a job record creation date and time.

10. The method of claim 9, further comprising the steps of:
identifying, using the server computer, a current time;
querying, using the server computer and at a regular interval, the database for at least one job record stored in the database;
receiving, at the server computer, a query result comprising the at least one job record;
for each at least one job record in the query result:
identifying, using the server computer, the job record creation date and time;
determining, using the server computer, whether a difference between the current time and the job record creation date and time is greater than the regular interval; and
in response to a determination that the difference between the current time and the job record creation date and time is greater than the regular interval, deleting, using the server computer, the at least one job record from the database;
for each at least one job record deleted from the database:
identifying, using the server computer, a job record identifier in the at least one job record; and
deleting, using the server computer, any job check in record in the database comprising the job record identifier.

11. The method of claim 4, wherein:
the request for the data list:
is received at the server computer at a regular interval; and
comprises an IP address of the server from which the request was received;
the querying step further comprises the step of temporarily storing, on the server computer, the IP address; and
the analyzing step further comprises the steps of:
identifying, using the server computer, a job record identifier for the at least one job record;
querying, using the at least one server computer, the database for at least one job check in record comprising the at least one job record identifier;
receiving, at the server computer, a query result;
determining, using the server computer, whether the query result comprises the at least one job check in record; and
in response to a determination that the query result does not comprise the at least one job check in record:
identifying, using the server computer, in the at least one job data record, a website data record identifying the website for which to remove the at least one website file;
inserting, using the server computer, into a list entry in the data list, a website identifier for the website identified in the at least one website data record; and
the data list transmitted to the at least one server computer comprises at least one list entry, each of the at least one list entry comprising:
the job record identifier for the at least one job record;
the website identifier for the website; and
the IP address temporarily stored on the server computer.

12. The method of claim 4, wherein:
the at least one instruction to write the at least one job check in record further comprises
an IP address from which the at least one instruction was received; and
the at least one job check in record written to the database comprises
the IP address.

13. A system for generating a data list of at least one website and configuring a server computer to clear a cache for the at least one website, the system comprising:
a server computer configured to:
communicate, over the communications network, from a control panel on a client computer, a request to remove from the cache at least one website file for a website;
write, to a database coupled to the communications network, a job record for the request, the job record comprising a job record identification data, a website identification data and a clear cache job type data;
receive a request, including a self-identifying IP address, by at least one server computer for the data list identifying the at least one website for which to remove the at least one website file from the cache;
query the database for at least one job record generated since the last regular interval and comprising the job record, each of the at least one job record:
not being associated, in the database, with at least one job check in record, the at least one job check in record comprising the job record identification data and the self-identifying IP address and indicating that the at least one website file has previously been removed from the cache during a time interval;
receive a query result comprising the at least one job record;
analyze the query result to identify the at least one website in the query result to add to the data list;
transmit the data list to the self-identifying IP address for each of the at least one server computer;
receive at least one instruction from the at least one server computer to write, to the database, the at least one job check in record for the job record; and
generate and write the at least one job check in record, comprising the job record identification data and the self-identifying IP address, to the database;
the at least one server computer acting as an edge server and a cache proxy in a content delivery network and configured to:
communicate at a regular interval, over a communications network, the request for the data list;
analyze the data list received over the communications network to identify the at least one website for which to remove the at least one website file from the cache;
remove the at least one website file from the cache; and
transmit, to the server computer, the at least one instruction to write, to the database, the at least one job check in record associated with the at least one job record.

14. The system of claim 13, further comprising a website control panel running on a client computer coupled to the communications network, the website control panel being configured to:
identify the website controlled by the website control panel;
receive, from a user, a request to remove the at least one website file from the cache;

connect to the server computer through the communications network;
transmit to the server computer:
a website identifier for the website; and
a request type for the request, the request type identified as a request to remove the at least one website file from the cache.

15. The system of claim 13, wherein the database comprises:
a website data table comprising at least one website record, each of the at least one website record comprising:
a unique website identifier data field; and
a domain name data field comprising a domain name of the website;
a jobs data table comprising at least one job record, each of the at least one job record comprising:
a unique job identifier data field;
a website identifier data field joined to the unique website identifier data field;
a job type data field; and
a job record creation date and time data field; and
a job check in data table comprising at least one job check in record, each of the at least one job check in record comprising:
a unique job check in identifier data field;
a job identifier data field joined to the unique job identifier data field;
an IP address data field; and
a job check in record creation date and time data field.

16. The system of claim 14, wherein the server computer is further configured to:
receive the request from the website control panel to remove the at least one website file from the cache;
analyze the request to identify, within the request:
the website identifier for the website; and
the request type for the request; and
temporarily store the request type.

17. The system of claim 16, wherein the server computer is further configured to:
query the database for a website record comprising the website identifier for the website;
receive, from the database, a query result;
determine whether the query result comprises at least one data record;
in response to a determination that the query result comprises the at least one data record, identify, within the at least one data record, a unique website identifier; and
in response to a determination that the query result does not comprise the at least one data record:
generate and write a website record to the database; and
identify, within the website record, the unique website identifier.

18. The system of claim 17, wherein the job record written to the database comprises:
the unique website identifier;
the request type temporarily stored by the server computer; and
a job record creation date and time.

19. The system of claim 13, wherein the at least one server computer is further configured to:
identify an IP address for the server computer;
transmit at a regular interval:
the request for the data list; and
the IP address identifying the server computer that requested the list; and
receive the data list comprising at least one list entry, each at least one list entry comprising:
a job record identifier;
a website identifier identifying the website for which to remove the at least one website file; and
at least one IP address of a server for which to remove the at least one website file for the website.

20. The system of claim 19, wherein:
at least one server computer is further configured to:
identify the IP address for the server computer;
determine whether the at least one IP address identified in the data list comprises the IP address for the server computer; and
in response to a determination that the at least one IP address identified in the data list comprises the IP address for the server computer:
temporarily store the job record identifier identified in the data list; and
remove, from the cache of the server computer, the at least one website file for the website identified by the website identifier; and
the at least one instruction to write the at least one job check in record further comprises:
the job record identifier identified in the data list;
the IP address identified for the server computer.

* * * * *